United States Patent
Wong et al.

(10) Patent No.: US 6,847,786 B2
(45) Date of Patent: Jan. 25, 2005

(54) COMPACT WAVELENGTH FILTER USING OPTICAL BIREFRINGENCE AND REFLECTIVE ELEMENTS

(75) Inventors: Charles Wong, Richardson, TX (US); Leo Yu-Yu Lin, Dallas, TX (US); Jian-Yu Liu, Garland, TX (US)

(73) Assignee: EC-Optics Technology, Inc., Taipei (TW)

( * ) Notice: Subject to any disclaimer, the term of this patent is extended or adjusted under 35 U.S.C. 154(b) by 792 days.

(21) Appl. No.: 09/730,320

(22) Filed: Dec. 4, 2000

(65) Prior Publication Data

US 2002/0163691 A1 Nov. 7, 2002

Related U.S. Application Data

(63) Continuation-in-part of application No. 09/274,270, filed on Mar. 22, 1999, now Pat. No. 6,163,393, which is a continuation-in-part of application No. 09/240,550, filed on Jan. 29, 1999, now Pat. No. 5,978,116, which is a continuation of application No. 08/739,424, filed on Oct. 29, 1996, now Pat. No. 5,867,291.

(51) Int. Cl.$^7$ ................................................ H04J 14/06
(52) U.S. Cl. ........................... 398/65; 398/74; 398/156; 359/498; 359/199
(58) Field of Search ............................. 398/46, 65, 74, 398/156; 359/491–499, 502

(56) References Cited

U.S. PATENT DOCUMENTS

| | | | |
|---|---|---|---|
| 3,391,970 A | 7/1968 | Sincerbox | 350/150 |
| 3,500,102 A | 3/1970 | Crost et al. | 313/109 |

(List continued on next page.)

FOREIGN PATENT DOCUMENTS

| | | | |
|---|---|---|---|
| EP | 0 362 900 A2 | 9/1985 | H04J/14/00 |
| EP | 0307244 | 3/1989 | G02F/1/31 |
| EP | 0370410 | 5/1990 | G02B/5/30 |
| EP | 1 136 857 A2 | 2/2001 | G02B/6/34 |

(List continued on next page.)

OTHER PUBLICATIONS

P. Melman et al., Tunable Birefringent Wavelength–Division Multiplexer/Demultiplexer, Electronics Letters, The Institution of Electrical Engineers Publishing & Information Services.

W. J. Carlsen et al., Flat Passband Birefringent Wavelength–Division Multiplexers.

(List continued on next page.)

*Primary Examiner*—Leslie Pascal
(74) *Attorney, Agent, or Firm*—Baker Botts L.L.P.

(57) ABSTRACT

A wavelength division multiplexing/demultiplexing device is presented utilizing a polarization-based filter to separate odd and even wavelengths, or upper and lower channels of an input optical signal. The wavelength filter first converts the input signal to a predetermined polarization. A series of birefringent waveplates provide a polarization-dependent optical transmission function such that the polarized beam is decomposed into a first beam component carrying the first spectral band at a first polarization and a second beam component carrying the second spectral band at a second, orthogonal polarization. A beam displacer spatially separates the beam components into a pair of orthogonally-polarized beams. A quarter-wave plate converts these orthogonally-polarized beams into a pair of circularly-polarized beams, which are reflected by a mirror back along parallel optical paths through the quarter-wave plate, beam displacer, and waveplates. In the return pass, the quarter-wave plate converts the reflected circularly-polarized beams into two orthogonally-polarized beams having polarizations that are rotated by 90 degrees from those in the forward pass. The waveplates further purify the spectral characteristics of the reflected beams and maintain the polarization of one of the reflected beams, while rotating the polarization of the other reflected beam by 90 degrees so that both reflected beams have substantially the same polarization. A routing element directs one of the reflected beams exiting the waveplates to a first output port and the other reflected beam to a second output port.

54 Claims, 13 Drawing Sheets

U.S. PATENT DOCUMENTS

| | | |
|---|---|---|
| 3,503,670 A | 3/1970 | Kosanke et al. ............ 350/150 |
| 3,719,414 A | 3/1973 | Wentz ........................ 350/150 |
| 3,892,468 A | 7/1975 | Duguay .................... 350/96 B |
| 3,920,983 A | 11/1975 | Schlafer et al. ............. 250/199 |
| 4,129,357 A | 12/1978 | Title et al. ................... 350/157 |
| 4,227,208 A | 10/1980 | Takanashi et al. ............ 358/55 |
| 4,359,268 A | 11/1982 | Kondo ........................ 350/377 |
| 4,461,543 A | 7/1984 | McMahon .................. 350/383 |
| 4,464,022 A | 8/1984 | Emkey ....................... 350/377 |
| 4,514,046 A | 4/1985 | Carlsen et al. ............. 350/385 |
| 4,566,761 A | 1/1986 | Carlsen et al. |
| 4,575,193 A | 3/1986 | Greivenkamp, Jr. ........ 350/401 |
| 4,626,897 A | 12/1986 | Sato et al. ................... 350/401 |
| 4,650,289 A | 3/1987 | Kuwahara .................... 358/44 |
| 4,671,613 A | 6/1987 | Buhrer ....................... 350/375 |
| 4,678,287 A | 7/1987 | Buhrer ....................... 350/404 |
| 4,685,773 A | 8/1987 | Carlsen et al. |
| 4,744,075 A | 5/1988 | Buhrer ........................... 370/3 |
| 4,745,591 A | 5/1988 | Foley ............................ 370/3 |
| 4,772,104 A | 9/1988 | Buhrer ....................... 350/403 |
| 4,919,522 A | 4/1990 | Nelson |
| 4,987,567 A | 1/1991 | Buhrer ........................... 370/3 |
| 5,009,477 A | 4/1991 | Alferness et al. ........ 350/96.15 |
| 5,033,830 A | 7/1991 | Jameson ..................... 350/403 |
| 5,040,896 A | 8/1991 | Moslehi ..................... 356/351 |
| 5,111,321 A | 5/1992 | Patel ............................ 359/92 |
| 5,136,671 A | 8/1992 | Dragone |
| 5,204,771 A | 4/1993 | Koga ......................... 359/281 |
| 5,231,521 A | 7/1993 | Johnson et al. ............... 359/93 |
| 5,243,455 A | 9/1993 | Johnson et al. ............... 359/93 |
| 5,262,892 A | 11/1993 | Nakamura .................. 359/484 |
| 5,274,679 A | 12/1993 | Abe et al. ................... 375/117 |
| 5,299,056 A | 3/1994 | Kurata et al. ............... 359/341 |
| 5,317,655 A | 5/1994 | Pan ............................. 385/11 |
| 5,319,483 A | 6/1994 | Krasinski et al. ........... 359/113 |
| 5,341,444 A | 8/1994 | Henry et al. ................. 385/11 |
| 5,345,174 A | 9/1994 | Kimmich et al. ........... 324/309 |
| 5,351,317 A | 9/1994 | Weber .......................... 385/3 |
| 5,355,249 A | 10/1994 | Souda et al. ................ 359/341 |
| 5,363,228 A | 11/1994 | DeJule et al. |
| 5,381,250 A | 1/1995 | Meadows |
| 5,414,540 A | 5/1995 | Patel et al. .................... 359/39 |
| 5,414,541 A | 5/1995 | Patel et al. |
| 5,444,725 A | 8/1995 | Zirngibl ....................... 372/20 |
| 5,463,493 A | 10/1995 | Shah ........................... 359/312 |
| 5,481,402 A | 1/1996 | Cheng et al. ............... 359/498 |
| 5,488,500 A | 1/1996 | Glance |
| 5,499,132 A | 3/1996 | Tojo et al. .................. 359/281 |
| 5,574,596 A | 11/1996 | Cheng ........................ 359/484 |
| 5,579,420 A | 11/1996 | Fukushima .................. 358/11 |
| 5,596,661 A | 1/1997 | Henry et al. |
| 5,600,742 A | 2/1997 | Zirngibl ....................... 385/37 |
| 5,606,439 A | 2/1997 | Wu |
| 5,619,359 A | 4/1997 | Redmond et al. ........... 359/117 |
| 5,680,490 A | 10/1997 | Cohen et al. |
| 5,694,233 A | 12/1997 | Wu et al. |
| 5,710,655 A | 1/1998 | Rumbaugh et al. ......... 359/249 |
| 5,718,226 A | 2/1998 | Riza ...................... 128/660.01 |
| 5,724,165 A | 3/1998 | Wu ............................. 359/117 |
| 5,729,377 A | 3/1998 | Bergmann .................. 359/249 |
| 5,751,384 A | 5/1998 | Sharp ........................... 349/18 |
| 5,771,120 A | 6/1998 | Bergmann .................. 359/484 |
| 5,781,293 A | 7/1998 | Padgett et al. .............. 356/346 |
| 5,809,190 A | 9/1998 | Chen |
| 5,867,291 A | 2/1999 | Wu et al. |
| 5,912,748 A | 6/1999 | Wu et al. |
| 5,912,754 A | 6/1999 | Koga et al. |
| 5,923,472 A | 7/1999 | Bergmann .................. 359/618 |
| 5,930,028 A | 7/1999 | Bergmann .................. 359/303 |
| 5,930,039 A | 7/1999 | Li et al. ...................... 359/484 |
| 6,002,512 A | 12/1999 | Bergmann et al. .......... 359/281 |
| 6,005,697 A | 12/1999 | Wu et al. ................... 359/117 |
| 6,040,942 A | 3/2000 | Bergmann .................. 359/487 |
| 6,055,101 A | 4/2000 | Bergmann et al. .......... 359/484 |
| 6,067,178 A | 5/2000 | Zheng ........................ 359/124 |
| 6,091,543 A | 7/2000 | Bergmann .................. 359/495 |
| 6,097,517 A | 8/2000 | Okayama .................... 359/124 |
| 6,125,221 A | 9/2000 | Bergmann et al. ............ 385/33 |
| 6,130,971 A | 10/2000 | Cao ............................ 385/31 |
| 6,134,031 A | 10/2000 | Nishi et al. .................. 359/15 |
| 6,163,393 A | 12/2000 | Wu et al. .................... 359/127 |
| 6,173,092 B1 | 1/2001 | Bergmann .................... 385/16 |
| 6,212,313 B1 | 4/2001 | Li |
| 2001/0055158 A1 | 12/2001 | Zhao .......................... 359/632 |

FOREIGN PATENT DOCUMENTS

| | | | |
|---|---|---|---|
| JP | 61-97629 | 5/1986 | ............ G02F/1/31 |
| JP | 1140134 | 6/1989 | ............ G02F/1/31 |
| JP | 2007026 | 1/1990 | ............ G02F/1/31 |
| JP | 3276119 | 12/1991 | .......... G02F/27/28 |
| JP | 4128715 | 4/1992 | ............ G02F/1/09 |
| JP | 6-181352 | 6/1994 | ............ G02F/1/35 |
| WO | WO 00/57589 | 9/2000 | ............ H04J/14/02 |

OTHER PUBLICATIONS

Yohji Fujii et al., Wavelength–Division Multi/Demultiplexer Utilizing Optically Active Crystals, Journal of Lightwave Technology, Jul. 1990, pp. 1051–1054, vol. 8, No. 7, IEEE.

Hideki Ishio et al., Review and Status of Wavelength–Division–Multiplexing Technology and Its Application, Journal of Lightwave Technology, Aug. 1984, pp. 448–463, vol. LT–2, No. 4, IEEE.

H. F. Mahlein, Fiber–Optic Communication in the Wavelength–Division Multiplex Mode, Fiber and Integrated Optics, 1983, pp. 339–373, vol. 4, No. 4, Crane, Russak & Co., Inc.

Amman, "Synthesis of Electro–Optic Shutters having a Prescribed Transmission vs Voltage Characteristic", Journal of the Optical Society of America (vol. 56, No. 8, pp. 1081–1088, Aug. 1966).

Harris et al., "Optical Network Synthesis Using Birefringent Crystals. *I. Synthesis of Lossless Networks of Equal–Length Crystals", Journal of the Optical Society of America (vol. 54, No. 10, pp. 1267–1279, Oct. 1964).

Senior et al., "Devices for Wavelength–Multiplexing and Demultiplexing", IEE Proceedings (vol. 136, Pt. J, No. 3, Jun. 1989).

Nosu et al., "Optical FDM Transmission Technique", Journal of Lightwave Technology (vol. LT–5, No. 9, Sep. 1987).

Inoue et al., "A Four–Channel Optical Waveguide Multi/Demultiplexer for 5–GHz Spaced Optical FDM Transmission", Journal of Lightwave Technology (vol. 6, No. 2, Feb. 1988).

Chung et al., "Analysis of a Tunable Multichannel Two–Mode–Interference Wavelength Division Multiplexer/Demultiplexer", Journal of Lightwave Technology (vol. 7, No. 5, May 1989).

Damask et al., "Wavelength–Division Multiplexing using Channel–Dropping Filters", Journal of Lightwave Technology (vol. 11, No. 3, Mar. 1993).

Dingel and Izutsu, "Multifunction Optical Filter with a Michelson–Gires–Tournois Interferometer for Wavelength–Division–Multiplexed Network System Applications", Optical Letters (vol. 23, p. 1099, Jul. 1998).

PCT Report for PCT/US 02/ 00185, 8 pages, Oct. 9, 2002.

Sakano et al., "Turnover–Type Free–Space Multichannel Optical Switch," OSA Proceedings on Photonics in Switching, vol. 16, Mar. 15, 1993.

COMPACT WAVELENGTH FILTER USING OPTICAL BIREFRINGENCE AND REFLECTIVE ELEMENTS

RELATED APPLICATIONS

The present application is a continuation-in-part of the Applicants' U.S. patent application Ser. No. 09/274,270, entitled "Method and Apparatus for Wavelength Multiplexing/Demultiplexing," filed on Mar. 22, 1999, now U.S. Pat. No. 6,163,393, issued on Dec. 19, 2000, which is a continuation-in-part of U.S. patent application Ser. No. 09/240,550, filed on Jan. 29, 1999, now U.S. Pat. No. 5,978,116, issued on Nov. 2, 1999, which was a continuation of U.S. patent application Ser. No. 08/739,424, filed on Oct. 29,1996, now U.S. Pat. No. 5,867,291, issued on Feb. 2, 1999.

BACKGROUND OF THE INVENTION

1. Field of the Invention

The present invention relates generally to the field of optical wavelength filters. More specifically, the present invention discloses a compact wavelength filter using optical birefringence and reflective elements, primarily for wavelength division demultiplexing in optical communications systems.

2. Background of the Invention

Wavelength division multiplexing is a commonly used technique that allows the transport of multiple optical signals, each at a slightly different wavelength, on an optical fiber. The ability to carry multiple signals on a single fiber allows that fiber to carry a tremendous amount of traffic, including data, voice, and even digital video signals. As an example, the use of wavelength division multiplexing permits a long distance telephone company to carry thousands or even millions of phone conversations on one fiber. By using wavelength division multiplexing, it is possible to effectively use the fiber at multiple wavelengths, as opposed to the costly process of installing additional fibers.

In wavelength division multiplexing techniques, multiple wavelengths can be carried within a specified bandwidth. It is advantageous to carry as many wavelengths as possible in that bandwidth. International Telecommunications Union (ITU) Draft Recommendation G.mcs, incorporated herein by reference, proposes a frequency grid which specifies various channel spacings including 100 GHz and 200 GHz. It would be advantageous to obtain 50 GHz spacing. Separating and combining wavelengths with these close spacings requires optical components which have high peak transmission at the specified wavelengths and which can provide good isolation between separated wavelengths.

One technique which has been developed to accomplish the demultiplexing of closely-spaced wavelengths is to cascade a series of wavelength division demultiplexing devices, each device having different wavelength-separating characteristics. A typical application involves cascading an interferometric device such as an arrayed waveguide device having a narrow spacing of transmission peaks (e.g., 50 GHz) with a second interferometric device which has a coarser spacing and correspondingly broader transmission peaks (e.g., 100 GHz spacing). The cascade of devices provides the separation of wavelengths by subdividing the wavelengths once in the first device, typically into a set of odd and even channels, and then separating wavelengths in the subsets in following devices in the cascade.

Arrayed waveguide (AWG), fused biconical taper (FBT), fiber Bragg grating (FBG), diffraction grating, and other interferometric wavelength demultiplexing devices can be constructed to have the appropriate characteristics for the first or second stage devices in the cascade. However, traditional interferometric devices have the characteristic that as the spacing of the channels is decreased, the transmission peaks become narrower, and are less flat over the wavelength region in the immediate vicinity of each peak than a device with wider channel spacings. As a result, when using a traditional device in the first stage of a cascade, the transmission peaks may not have a high degree of flatness, and any drift or offset of a wavelength from its specified value may result in significant attenuation of that wavelength. In addition, the isolation between wavelengths is frequently unsuitable with conventional interferometric devices and can result in unacceptable crosstalk between channels.

With increasing numbers of wavelengths and the close wavelength spacing which is utilized in dense wavelength division multiplexing systems, attenuation and crosstalk must be closely controlled to meet the system requirements and maintain reliable operations. As an example, 40 or 80 wavelengths can be generated using controllable-wavelength lasers, with transmission signals modulated onto each laser. It is desirable to be able to multiplex and demultiplex these channels onto one single optical fiber. Although the lasers can be controlled and the wavelengths stabilized to prevent one channel from drifting into another, there is always some wavelength drift which will occur. In a cascade architecture, the first stage of demultiplexing, or the last stage of multiplexing are where good peak flatness and high isolation are required in order to allow the separation/combining of closely spaced wavelengths.

For the foregoing reasons, there is a need for a wavelength division multiplexing/demultiplexing device which tolerates wavelength drift, maintains a high degree of isolation between channels, and is able to separate/combine large numbers of wavelengths.

SUMMARY OF THE INVENTION

The present invention encompasses a method and apparatus for wavelength division multiplexing/demultiplexing in which a cascade is formed between a polarization-based wavelength multiplexing/demultiplexing device and a second wavelength multiplexing/demultiplexing device. The polarization-based wavelength division multiplexing/demultiplexing device has transmission peaks which are substantially flat as a result of the characteristics of a polarization-based filter which is part of the device. In addition, the polarization filter provides a high degree of isolation between adjacent channels. The output of the polarization-based wavelength division multiplexing/demultiplexing device is received by a second stage of wavelength multiplexing devices which further separates the wavelengths. One advantage of the present invention is that the polarization-based wavelength multiplexing/demultiplexing device has good peak flatness and low crosstalk, and permits separation of closely spaced wavelengths (e.g., 50 GHz spacing). The subsequent devices in the cascade can be based on a number of technologies including arrayed waveguide technology, fused biconical taper technology, diffraction grating technology, fiber Bragg grating technology, interference filter, or can also be polarization-based devices. The subsequent devices are used to separate channels which have been formed into subgroups by the polarization-based wavelength multiplexing/demultiplexing device.

In a preferred embodiment the polarization-based wavelength multiplexer/demultiplexer creates two subsets, one subset containing the odd channels from the input channels, the other subset containing the even channels from the input channels. The second device further separates the wavelengths in the first and second subsets, resulting in a wavelength spacing at the output which is 2N times the wavelength spacing at the input of the polarization-based wavelength multiplexer/demultiplexer. In a preferred embodiment the second stage performs the subsequent demultiplexing operations. In an alternate embodiment multiple stages are used in the cascade to further separate the wavelengths and produce a single channel at the final output.

In an alternate embodiment, the polarization-based wavelength multiplexer/demultiplexer separates an upper band from a lower band. Subsequent stages are used to further separate the channels.

When a large number of channels are present, the polarization-based multiplexer/demultiplexer can be utilized to separate the channels into groups, and subsequent stages can be used to continue the multiplexing/demultiplexing process. In a preferred embodiment, when used as a demultiplexer, the present invention separates an input signal into two groups of channels, the even channels and the odd channels. A subsequent stage based on arrayed waveguide (AWG) technology performs the final multiplexing, resulting in individual channels at the output.

In a preferred embodiment the polarization-based wavelength division multiplexing/demultiplexing device is based on a polarization routing device which receives an optical signal carrying multiple channels at various wavelengths, separates the signal into vertical and horizontal polarizations, converts one of the polarizations to be identical to the other polarization, and performs filtering based on the wavelength of the signal, with the polarization of the output being dependent on the wavelength. A polarization routing stage routes light to a particular output depending on its polarization, and a polarization conversion and recombination stage combines the polarizations at each output to form an output signal.

In a preferred embodiment the polarization filter is composed of calcite birefringent crystal plates. A polarization mode dispersion compensator can be utilized in the device to reduce the polarization dispersion.

In the present invention the transmission function obtained in the first stage of a cascade demultiplexer has Fourier components such that the transmission function is substantially flatter and has steeper roll-off from the peaks than the transmission function in the second or subsequent stages. The additional Fourier components in the first stage result in a substantially square transfer function as compared to the second stage transfer function. In a preferred embodiment, the first stage transfer function is realized through the use of a polarization filter, which enables angle to be used as a variable in addition to path length, permitting the incorporation of the additional Fourier components necessary to make a square wave transfer function.

One advantage of the present invention is that it allows the use of low cost interferometric devices in second and higher stages of a wavelength division multiplexing/demultiplexing device while achieving good flatness and low crosstalk through the use of a polarization-based first stage.

In a preferred embodiment a large number of channels (e.g., 40 or 80) with 100 GHz spacing enter the device and are separated according to even and odd channels by a polarization-based first stage device with a spacing of 200 GHz. The second stage device is an arrayed waveguide device which separates the channels into individual channels which appear on the outputs, and which can be individually received by a telecommunications receiving device which is not wavelength selective.

These and other advantages, features, and objects of the present invention will be more readily understood in view of the following detailed description and the drawings.

BRIEF DESCRIPTION OF THE DRAWINGS

The accompanying drawings illustrate the embodiments of the present invention and, together with the description, serve to explain the principles of the invention.

DETAILED DESCRIPTION OF THE INVENTION

Figure 1:
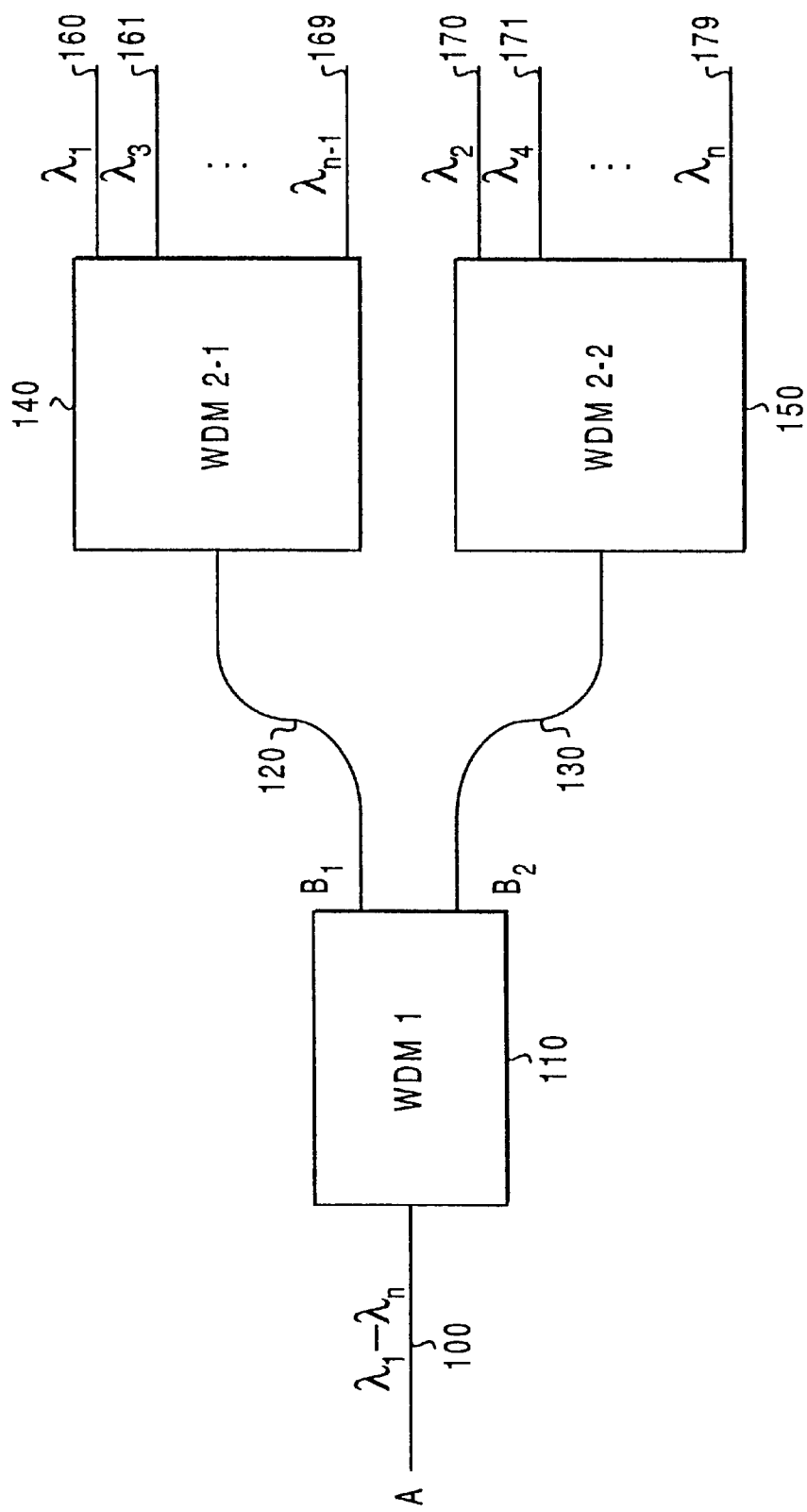
FIG. 1 is a diagram illustrating the concept of wavelength slicing and cascading of WDM filters.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

When used herein, the term multiplexer/demultiplexer refers to a device which can be used to either combine or separate wavelengths. However, such a definition does not preclude the use of the device for one function only. In addition, nonreciprocal elements can be added, precluding use of the device for one of the functions of multiplexing or demultiplexing, although the features and functionality of multiplexer/demultiplexer remain the same in the direction of use.

When used in a cascade, the term first stage refers to the first stage of the cascade in a demultiplexing configuration, where closely spaced wavelengths enter the system and are separated. When used in a multiplexing configuration, the last stage of the system performs the final multiplexing of the wavelengths, and corresponds to the first stage of the demultiplexer. When used herein the term first stage refers to the first stage in a demultiplexing operation and to the last stage in a multiplexing operation. The term flat-top slicer refers to a wavelength multiplexing/demultiplexing device with a substantially square input port to output port transmission function.

With reference to the drawings, in general, and FIGS. 1 through 6 in particular, the apparatus of the present invention is disclosed.

FIG. 1 illustrates a cascade of wavelength division multiplexers (WDMs). A number of channels at wavelengths $\lambda_1$ through $\lambda_n$ appear at input port A 100 which is part of WDM 1 110. In a preferred embodiment WDM 1 110 separates out a first subset of odd numbered wavelengths which include $\lambda_1$ through $\lambda_{n-1}$ which appear on output port $B_1$ 120. Similarly, WDM 1 110 separates out a second subset of even numbered wavelengths which include $\lambda_2$ through $\lambda_n$ which appear on port $B_2$ 130. In an alternate embodiment the first set of wavelengths includes $\lambda_1$ through $\lambda_{n/2}$ and the second set of wavelengths includes $\lambda_{[(n/2)+1]}$ through $\lambda_n$.

Port $B_1$ 120 is coupled to WDM 2-1 140 which further separates out wavelength $\lambda_1$ which appears at port 160, wavelength $\lambda_3$ which appears at port 161, and remaining odd wavelengths through $\lambda_{n-1}$ which appears on port 169. Similarly, Port $B_2$ 130 is coupled to WDM 2-2 150 which further separates out wavelength $\lambda_2$ which appears at port 170, wavelength $\lambda_4$ which appears at port 171, and remaining even wavelengths through $\lambda_n$ which appears on port 179.

In an alternate embodiment the lower half of the wavelengths at input port A 100 are separated by WDM 2-1 140 and the upper half of the wavelengths at input port A 100 are separated by WDM 2-2 150.

Traditional interferometric devices suffer from the problem that as the transmission peak spacing is decreased, the flatness at the top of the transmission peak is reduced, due to the fact that the bandwidth at the top of the peak is reduced as a consequence of having more closely spaced peaks. While many WDM systems require that the variations in transmission be less than 0.5 dB over 0.3 nm or better, it is not generally possible to obtain such flatness using traditional interferometric devices. As a result, if there is any wavelength drift of any of the input signals, there will be subsequent attenuation due to the fact that the signal is no longer at a transmission peak. In addition, the isolation between signals at adjacent wavelengths can be unacceptable due to the fact that the attenuation at the bottom of the transmission curve is not low enough over a wide enough wavelength region. This reduced isolation can result in unacceptable crosstalk between channels.

Figure 2:
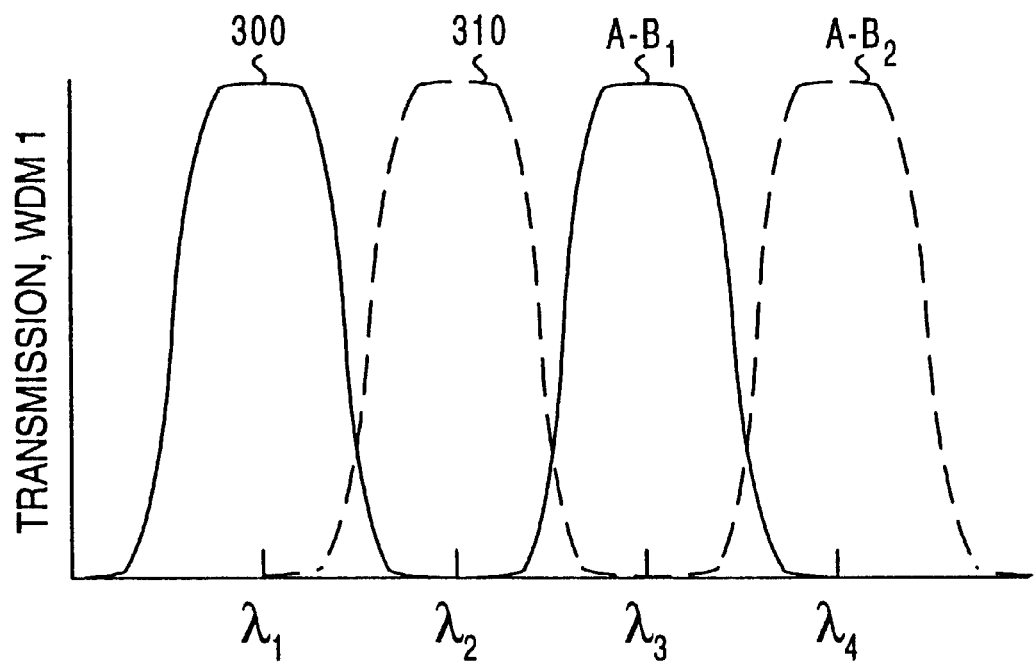
FIG. 2 is a graph illustrating the flat-top slicer spectral response.

The present invention avoids the aforementioned problems through the use of a flat-top slicer as WDM 1 110. The flat-top slicer provides a wavelength separating function which has adequate flatness and isolation. The transmission function for the flat-top slicer is illustrated in FIG. 2. Solid line 300 represents the transmission from port A 100 to port $B_1$ 120 in a flat-top slicer while dotted line 310 represents the transmission from port A 100 to port $B_2$ 130 in a flat top slicer.

In a preferred embodiment the flat-top slicer is realized based on a polarization-based wavelength filter containing a polarization filter. Polarization filters provide the ability to obtain a tailored optical response as a function of wavelength and can provide superior performance over non-polarization based filters because they permit the use of polarization angle as well as path length (thickness) as a variable in creating the filter response. Polarization filters are typically embedded in an optical system which subsequently recombines the polarizations to produce a polarization-independent device. Polarization filters are well understood by those skilled in the art, and are described in published books and literature, including the book by A. Yariv and P. Yeh entitled "Optical Waves In Crystals," which is incorporated herein by reference.

For example, the polarization filter can be composed of a plurality of birefringent elements, such as birefringent crystal plates (e.g., calcite or other birefringent crystalline materials). The polarization filter could also be made using a polarization fiber. A polarization mode dispersion compensator can be utilized in the device to reduce the polarization dispersion.

Figure 4:
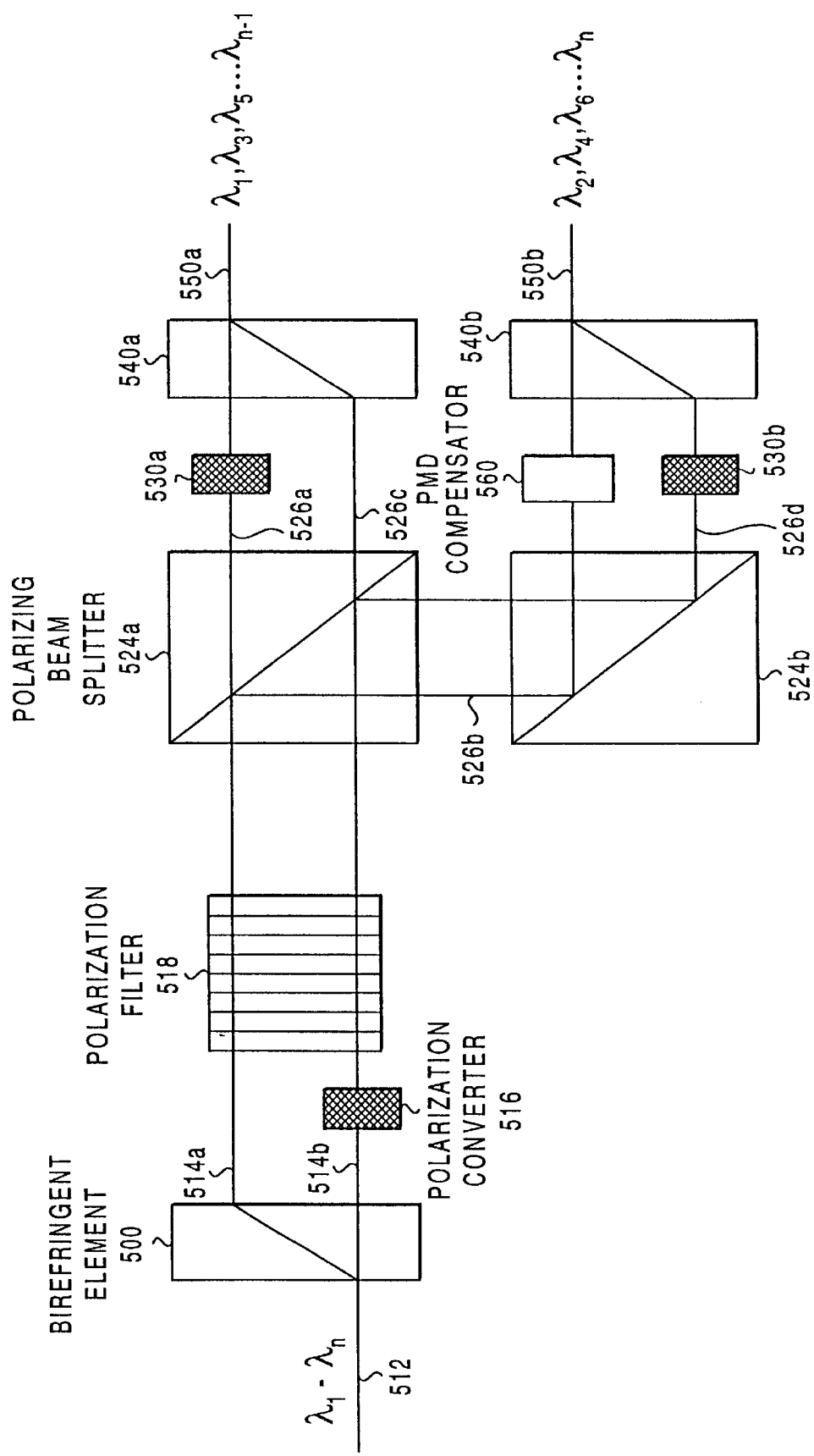
FIG. 4 is a diagram illustrating the configuration for a wavelength filter for spectral slicing.

FIG. 4 illustrates an example of a polarization-based wavelength filter that can be used to realize the present invention. When used herein, the term flat-top slicer refers to such a wavelength filter or its equivalents. The flat-top slicer is employed as WDM-1 110 in FIG. 1. This device has been described in detail in U.S. patent application U.S. patent application Ser. No. 09/156,211 entitled "Programmable Optical Add/Drop Multiplexer," filed Sep. 17, 1998.

As shown in FIG. 4, an optical signal carrying eight optical channels 512 enters the system and is decomposed in a birefringent element 500 into two orthogonally-polarized beams, namely vertical and horizontal polarizations 514*a* and 514*b* respectively. One of the beams 514*b* is passed through a polarization converter or rotator 516, so that both beams have the same state of polarization (vertical or horizontal).

These two beams then pass through a polarization filter 518. The polarization filter 518 is preferably a stacked plurality of birefringent waveplates with their optical axis oriented at selected angles to create a polarization interference filter. Examples of materials suitable for construction of the birefringent waveplates include calcite, rutile, lithium niobate, $YVO_4$-based crystals, and the like. This type of optical element is also sometimes referred to as a composite waveplate, or CWP. The polarization filter 518 has two eigen states. The first eigen state carries a first sub-spectrum with the same polarization as the input, and the second eigen state carries a complementary sub-spectrum at the orthogonal polarization. The polarization of the incoming beam and the two output polarizations form a pair of spectral responses, where (H, H) and (V, V) carry the first part of the input spectrum and (H, V) and (V, H) carry the complementary, second part of the input spectrum, where V and H are vertical and horizontal polarizations, respectively. Further details of the design and the filtering mechanism of the polarization filter 518 are disclosed in the Applicants' U.S. patent application Ser. Nos. 08/739,424 and 08/780,291.

For example, the polarization filter 518 can be constructed so that the odd-channels are coded with (output in) horizontal polarization and the even channels are coded with vertical polarization. Ideally, the polarization filter 518 functions as a polarization interference filter having a comb filter response curve with a substantially flat top or square wave spectral response. In an alternate embodiment polarization filter 518 can be constructed to polarize code lower and higher channels differently, resulting in routing according to the channel position in the upper or lower parts of the input band. These two polarizations are then separated by the following polarized beamsplitter (PBS), 524a and 524b, which passes the horizontal polarization 526a, c straight through the PBS and deflects the vertical polarization 526b, d by 90 degrees. Because the odd and even channels reside within the two polarizations respectively, they are spatially separated after the PBS.

Referring to FIG. 4, polarization converters 530a, 530b are used to convert polarizations by 90°, and birefringent elements 540a and 540b recombine the polarizations to produce odd numbered wavelengths at output port 550a and even numbered wavelengths at output port 550b. In a preferred embodiment polarization converters 530a, 530b are half wave plates.

Figure 5A:
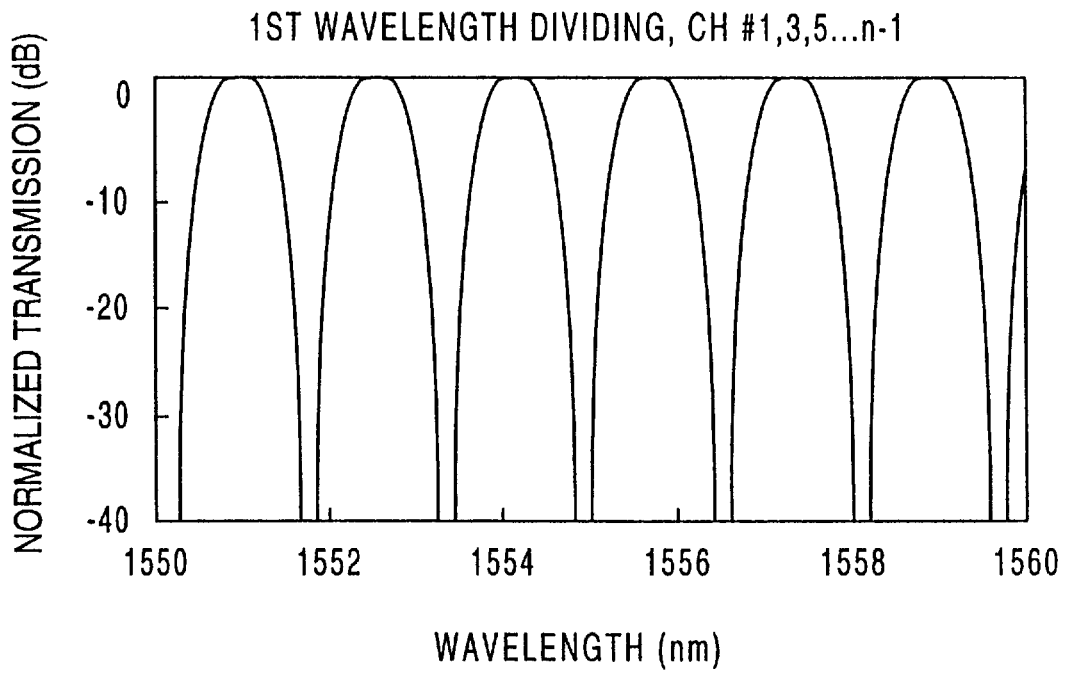
FIGS. 5a and 5b are graphs illustrating the spectral response for flat-top spectral slicers.
Figure 5B:
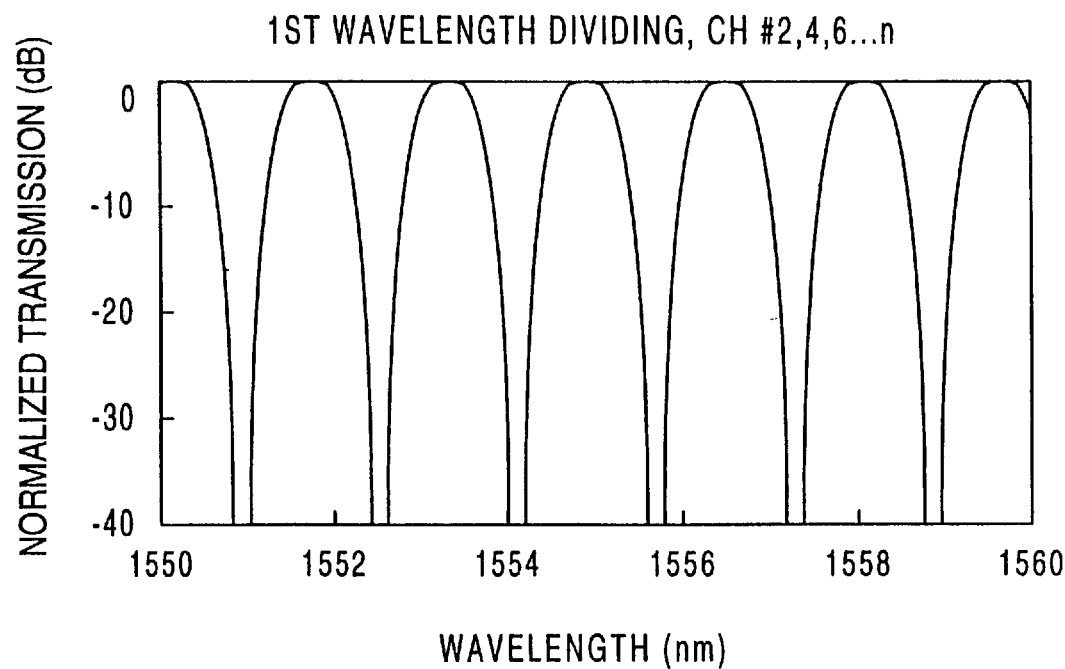

FIG. 5A illustrates the transmission characteristics of polarization filter 518 for light with a first (e.g., vertical) polarization, and FIG. 5B illustrates transmission through the polarization filter 518 for a second (e.g., horizontal) polarization. The transmission envelopes are shaped to provide sufficient width, as depicted, to tolerate expected wavelength drift while still being sufficiently narrow to achieve the necessary discrimination with respect to other channels. In one embodiment, suitable filters may be made as described in U.S. Pat. No. 5,694,233 entitled "Switchable Wavelength Router," or U.S. patent application Ser. No. 09/020,706 entitled "Temperature Insensitive Polarization Filter," both incorporated herein by reference.

A polarization mode dispersion compensator 560 can be used as illustrated in FIG. 4. Polarization mode dispersion is defined as the difference in the propagation time between the two orthogonal polarization components. In a polarization-based routing device, different propagation delays may occur between two routes. As illustrated in FIG. 4, the propagation times resulting from the propagation path in the through port (output port 550a) are equal for both polarizations. On the other port (output port 550b) one of the polarization beams 526d passes through two half-wave plates, while the other 526b does not. To minimize the difference in propagation times for these two beams, a polarization mode dispersion (PMD) compensator 560 is inserted into path 526b. In a preferred embodiment, an isotropic glass plate is used to realize the PMD 560. Alternate materials can be used to realize the PMD compensator 560 and are known to those skilled in the art.

Figure 6:
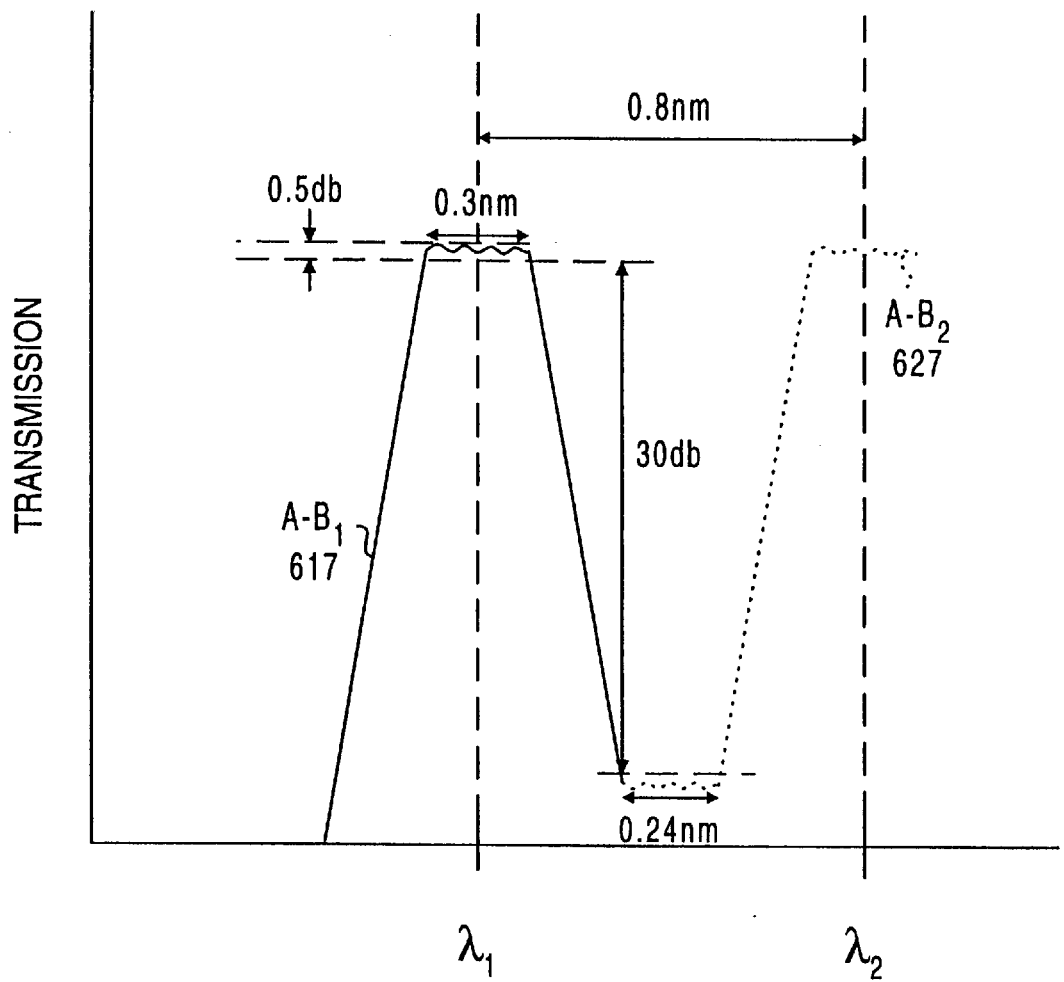
FIG. 6 is a graph illustrating a typical spectral response for a polarization-based wavelength separation device.

FIG. 6 illustrates in greater detail the transmission characteristics of a flat-top slicer when used with a channel spacing of 100 GHz (approximately 8 nm). At the transmission peak a flatness of 0.5 dB over a range of 0.3 nm can be obtained using a polarization filter in a polarization-based routing device. In terms of isolation, the transmission minimum can be 30 dB lower than the transmission value, and can remain that low over a 0.24 nm range between wavelength peaks. As a result, the flat-top slicer can tolerate wavelength drift and maintains low attenuation (high transmission) and low co-channel interference (low crosstalk). The solid portion 617 of the curve in FIG. 6 represents the transmission function from port A–B$_1$, while the dotted portion 627 represents the transmission function between ports A–B$_2$.

Figure 3:
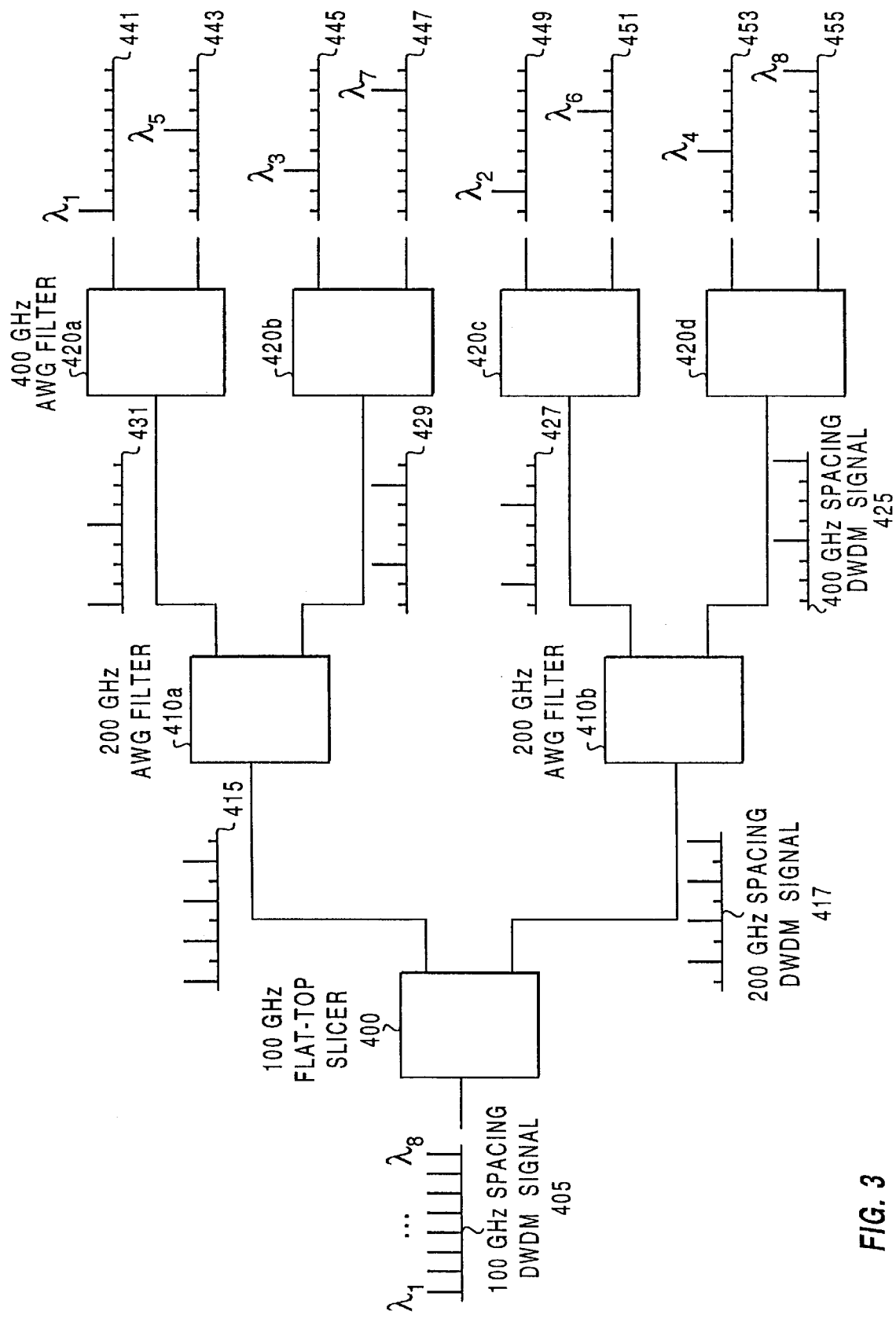
FIG. 3 is a diagram illustrating a flat-top slicer followed by two stages of filters.

FIG. 3 illustrates an industrial application of the present invention in which a 100 GHz-spaced dense wavelength division multiplexing (DWDM) signal 405 enters a 100 GHz flat-top slicer 400, which produces an odd-channel 200 GHz-spacing DWDM signal 415 and an even channel 200 GHz spacing signal 417. Two 200 GHz filters 410a, 410b are used to produce a 400 GHz-spaced signal carrying wavelengths $\lambda_1$ and $\lambda_5$ 431, a signal carrying wavelengths $\lambda_3$ and $\lambda_7$ 429, a signal carrying wavelengths $\lambda_2$ and $\lambda_6$ 427, and a signal carrying wavelengths $\lambda_4$ and $\lambda_8$ 425. A third stage of filters 420a–d are used to produce the individual channels $\lambda_1$ through $\lambda_8$ on outputs 441, 449, 445, 453, 443, 451, 447 and 455 respectively. By using a flat-top slicer as the first stage for wavelength separation, good isolation and tolerance to wavelength drift is obtained. Subsequent stages can be based on alternate technologies, since the wavelengths have been separated by one channel spacing in flat-top slicer 400. In an alternate embodiment, the subsequent stages can be based on flat-top slicers using polarization-based filters in a polarization multiplexing/demultiplexing device. In yet another embodiment, the second and third stages are combined in one device, which can be based on arrayed waveguide (AWG) or an alternate technology.

Alternative Wavelength Filters Using Reflective Elements

Alternative embodiments of the wavelength filter are shown in FIGS. 7 through 11 that could be employed as a flat-top slicer. These embodiments use reflective elements to create a compact optical configuration and enhanced performance.

Figure 7:
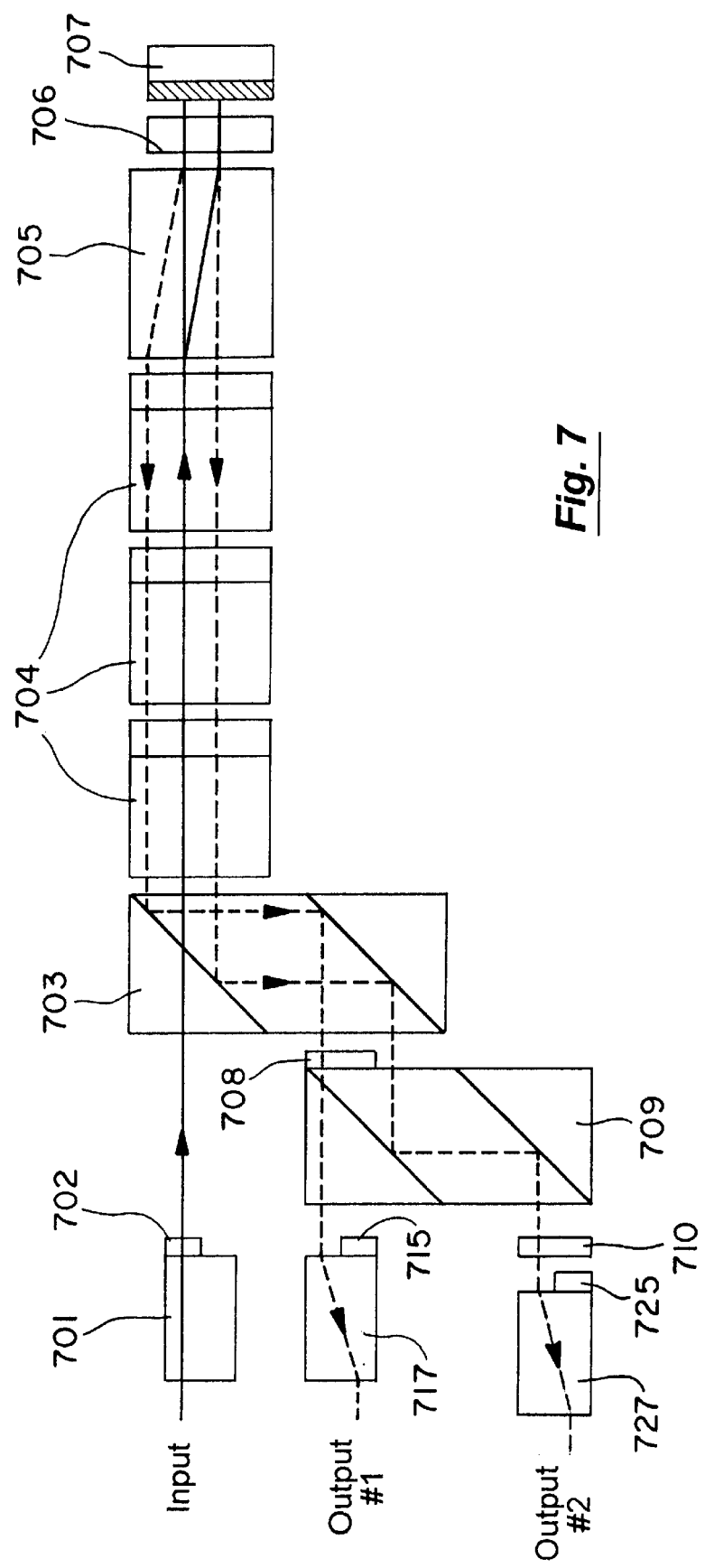
FIG. 7 is a schematic diagram of an alternative embodiment of the wavelength filter showing the optical paths of the beams resulting from the first polarized component of the input beam.
Figure 8:
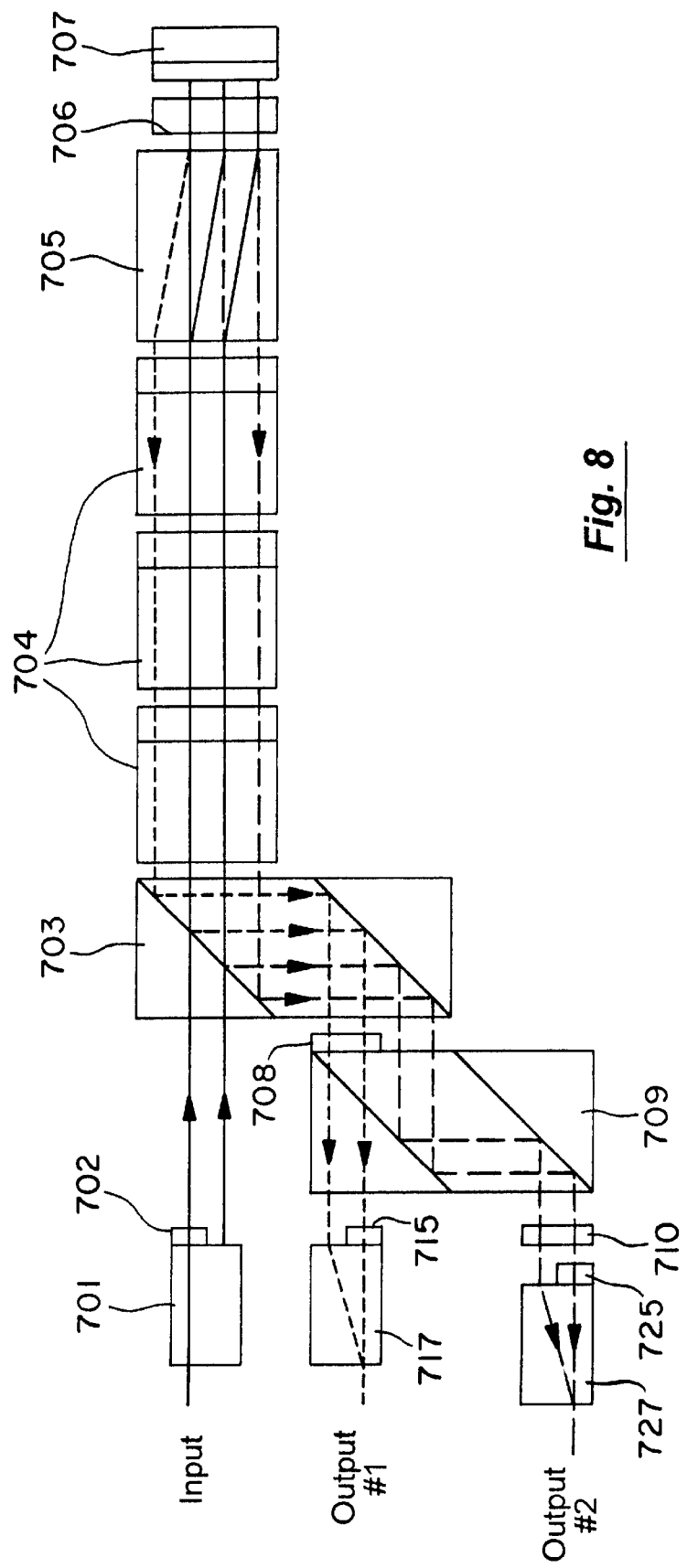
FIG. 8 is a schematic diagram of the wavelength filter corresponding to FIG. 7, showing the optical paths of the beams resulting from the second, orthogonally-polarized component of the input beam.

FIGS. 7 and 8 are two schematic diagrams showing a second embodiment of the wavelength filter. As in the previous embodiment depicted in FIG. 4, the input beam initially passes through a birefringent element 701 that spatially separates horizontal and vertically polarized components of the input signal. The birefringent element 701 allows the vertically-polarized portion of the input signal to pass through without changing course, as shown in FIG. 7, because they are ordinary waves in element 701. In contrast, horizontally-polarized waves are redirected at an angle because of the birefringent walk-off effect, as shown in FIG. 8. The angle of redirection is a well-known function of the particular materials chosen. Examples of materials suitable for construction of the birefringent elements used in the embodiments of the present invention include calcite, rutile, lithium niobate, YVO$_4$-based crystals, and the like.

FIG. 7 illustrates the optical paths of the beams resulting from the first polarized component of the input beam, while FIG. 8 shows the optical paths of the beams resulting from the second, orthogonally-polarized component of the input beam. FIGS. 7 and 8 are presented as separate drawings in the interest of clarity due to the complexity of the beam paths. It should be understood that both of the orthogonally-polarized beams exiting the birefringent element 701 in FIGS. 7 and 8 exist simultaneously. The orthogonally-polarized beams exiting the birefringent element 701, as shown in FIGS. 7 and 8, both comprise the full spectrum of the input WDM signal.

At least one of the orthogonally-polarized beams passes through a polarization rotator or converter 702 (e.g., a half-wave plate, twisted nematic liquid crystal rotator, ferroelectric liquid crystal rotator, pi-cell based liquid crystal rotator, magneto-optic based Faraday rotator, acousto-optic or electro-optic based polarization rotator), which rotates the beam polarization so that both beams have substantially the same polarization. Alternatively, the birefringent element 701 and polarization rotator 702 could be replaced with a polarizing filter that converts the input beam to a single beam having a predetermined polarization. For purposes of this disclosure, both embodiments should be construed as a "polarizer" to convert the input signal to a predetermined polarization.

Both beams then pass through a first polarization-dependent routing element 703, such as a polarized beam-splitter or a rhomboid prism having a PBS coating on its upper interface, as shown in the FIGS. 7 and 8. The beams then pass through a series of birefringent waveplates 704 that function in the same manner as the stacked waveplates of the polarization filter 518 in FIG. 4. In particular, the waveplates 704 provide a polarization-dependent optical transmission function such that each polarized input beam is decomposed into a first beam component carrying the first spectral band at a first polarization and a second beam component carrying the second spectral band at a second polarization that is orthogonal to the first polarization, as previously described.

A beam displacer 705 (e.g., a birefringent element) spatially separates the beam components exiting the waveplates 704 into corresponding pairs of orthogonally-polarized beams (i.e., two orthogonally-polarized beam pairs in the embodiment shown in FIGS. 7 and 8). A quarter-wave plate 706 converts these orthogonally-polarized beam pairs into circularly-polarized beams, which are then reflected by a mirror 707 back along optical paths through the quarter-wave plate 706, beam displacer 705, and waveplates 704. Any type of reflector could be used in place of a mirror 706.

On the return pass, the quarter-wave plate 706 converts the circularly-polarized reflected beam pairs into corresponding pairs of orthogonally-polarized beams having polarizations that are rotated by 90 degrees from those of the orthogonally-polarized beam pairs entering the quarter-wave plate 706 from the beam displacer 705 on the forward pass. The beam displacer 705 routes the reflected beam pairs along optical paths through the waveplates 704 that are offset, but parallel to the optical paths of the corresponding polarized input beams. The waveplates 704 further purify the spectral characteristics of the reflected beams. The waveplates 704 maintain the polarization of one of the reflected beams of each pair, while rotating the polarization of the other reflected beam, so that both beams in each reflected pair exit the waveplates 704 with substantially the same polarization. Also, the polarization of the reflected beams is orthogonal to that of the polarized input beams exiting elements 701 and 702.

The first polarization-dependent routing element 703 spatially separates the reflected beams from the polarized input beam based on their respective polarizations, and reflects the reflected beams downward and to the left as illustrated in FIGS. 7 and 8. One beam from each beam pair is routed through a polarization rotator 708, so that each beam pair becomes orthogonally polarized. A second polarization-dependent routing element 709 directs one beam from both beam pairs toward each of the output ports. As before, each output port includes a polarization rotator 715, 725 and a final birefringent element 717, 727 that combine the beams at each output port. A polarization dispersion mode (PMD) compensator 710 can be included along one of the output port beam paths to compensate for the difference in the lengths of the optical paths.

Figure 9:
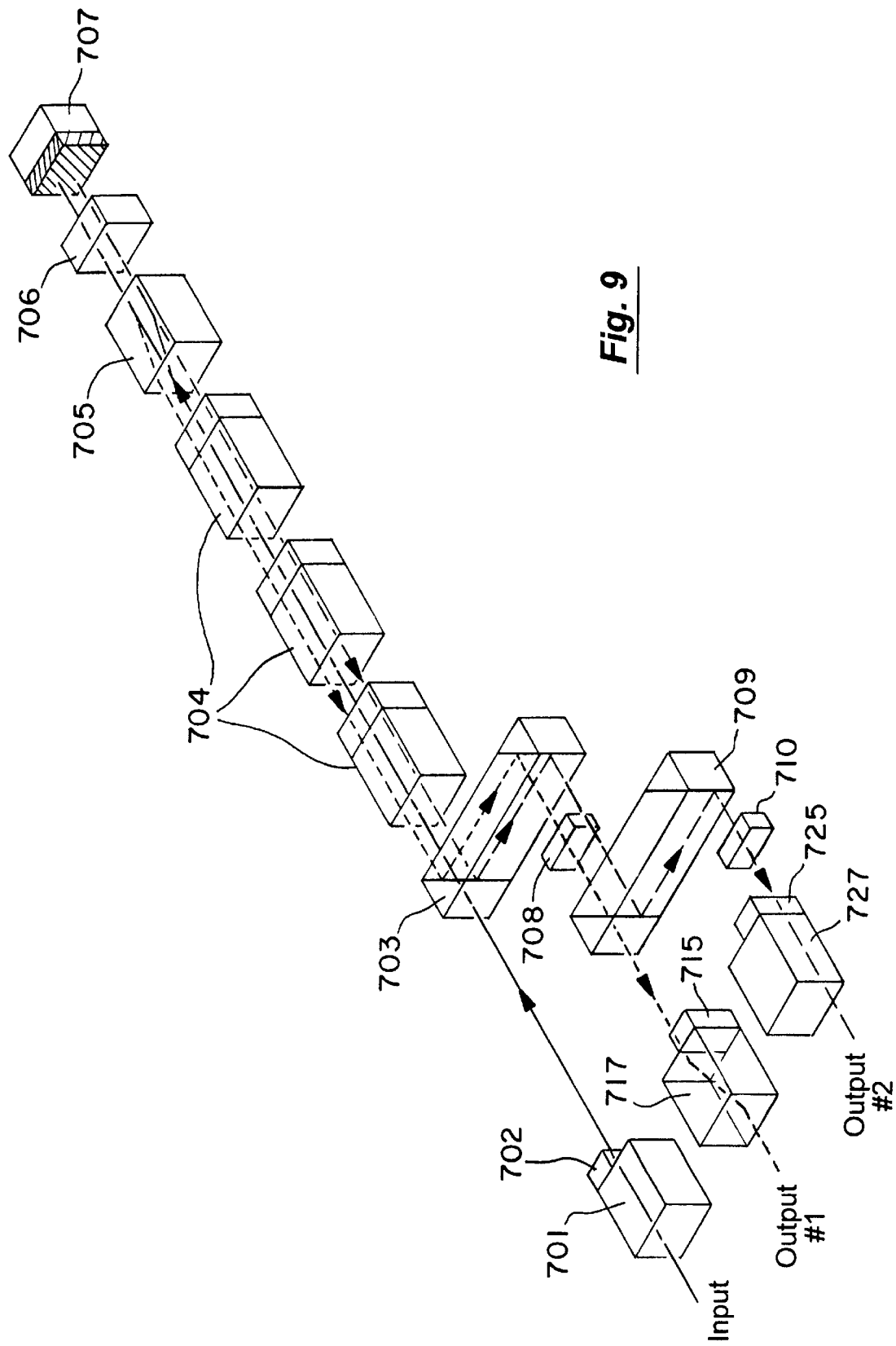
FIG. 9 is a perspective view of another embodiment of the wavelength filter using a vertical beam displacer.

FIG. 9 is a perspective view of a slightly different embodiment of the wavelength filter using a vertical beam displacer. In contrast to the embodiment shown in FIGS. 7 and 8, the reflected beams travel in the same horizontal plane through the waveplates 704 as the polarized input beam.

Figure 10:
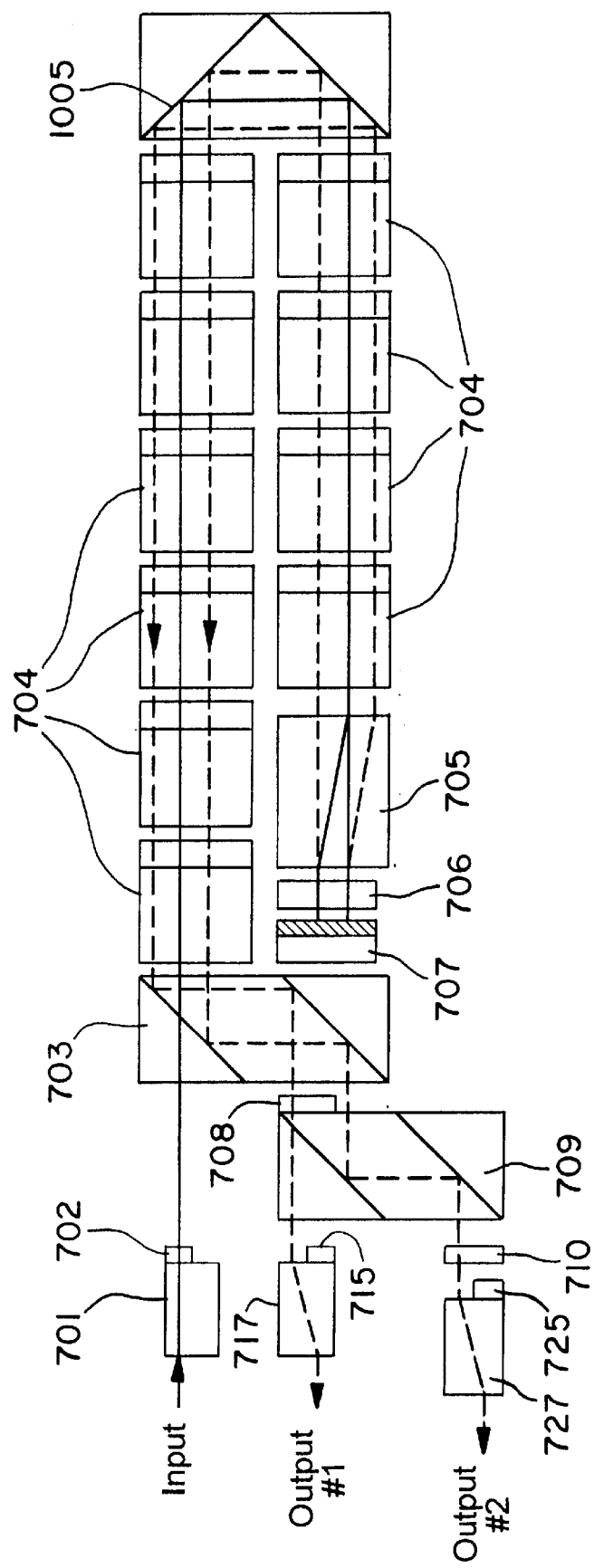
FIG. 10 is a schematic diagram of another embodiment of the wavelength filter using a mirrored prism to fold the optical paths.

FIG. 10 is a schematic diagram of another embodiment of the wavelength filter using a mirrored prism 1005 to fold the optical paths. This configuration results in a more compact device.

Figure 11:
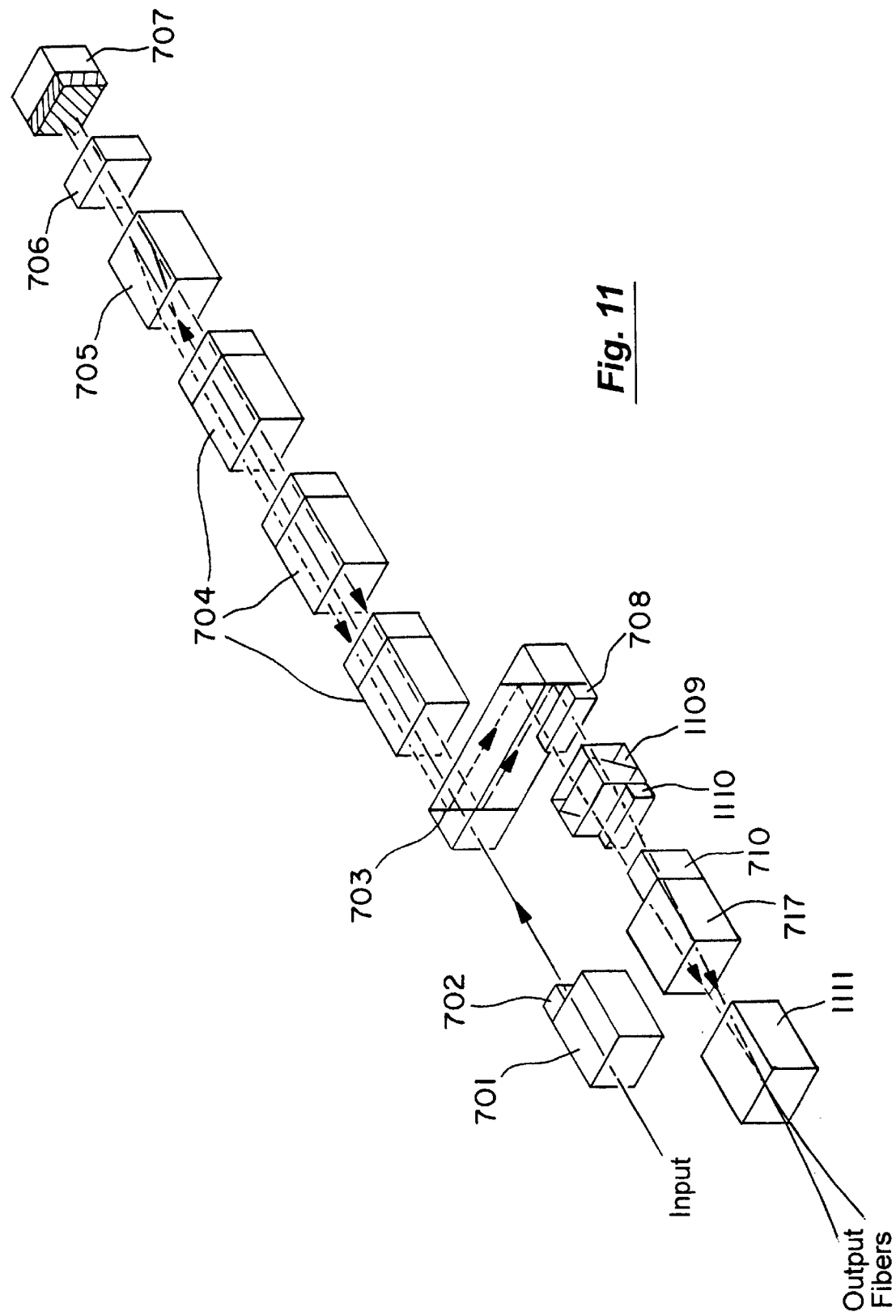
FIG. 11 is a perspective view of another embodiment of the wavelength filter using a Wollaston prism and a dual-core collimator.

FIG. 11 is a perspective view of another embodiment of the wavelength filter using a Wollaston prism 1109 and a dual-core collimator 1111 to direct the output beams into two optical fibers. This configuration helps to reduce the overall size of the device. The Wollaston prism consists of two birefringent crystals having different indices of refraction with their respective optical axes orthogonal to one another. A half-wave plate 708 rotates the polarization of one of the beams by 90 degrees prior to entering the Wollaston prism 1109. A second half-wave plate 1110 returns the beam to its original polarization following the Wollaston prism 1109.

Figure 12:
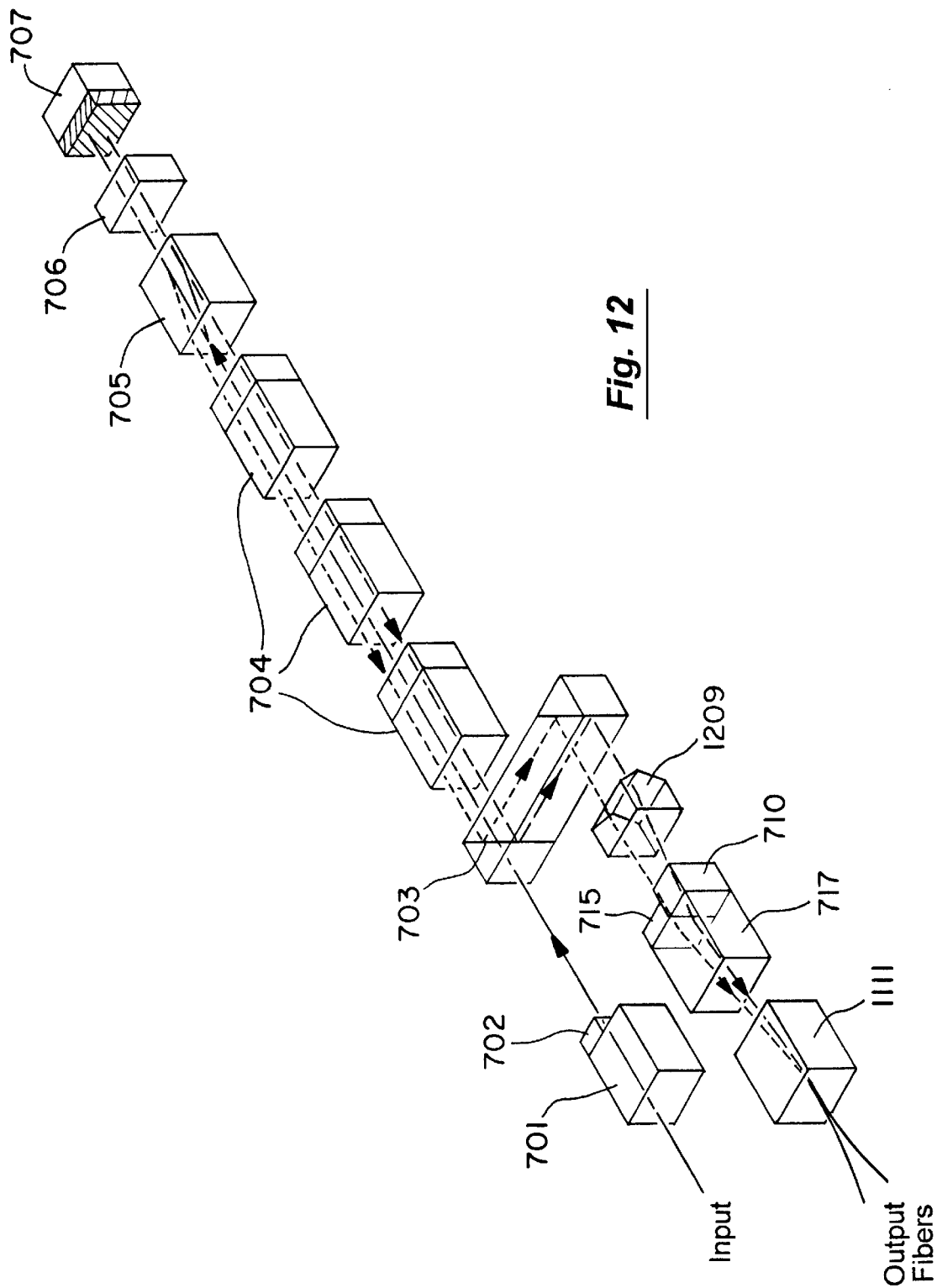
FIG. 12 is a perspective view of another embodiment of the wavelength filter using an angle compensator prism and a dual-core collimator.

FIG. 12 is a perspective view of another embodiment of the wavelength filter using an angle compensator prism 1209 in place of the Wollaston prism 1109 in FIG. 11 to converge the output beams toward the dual-core collimator 1111.

Figure 13:
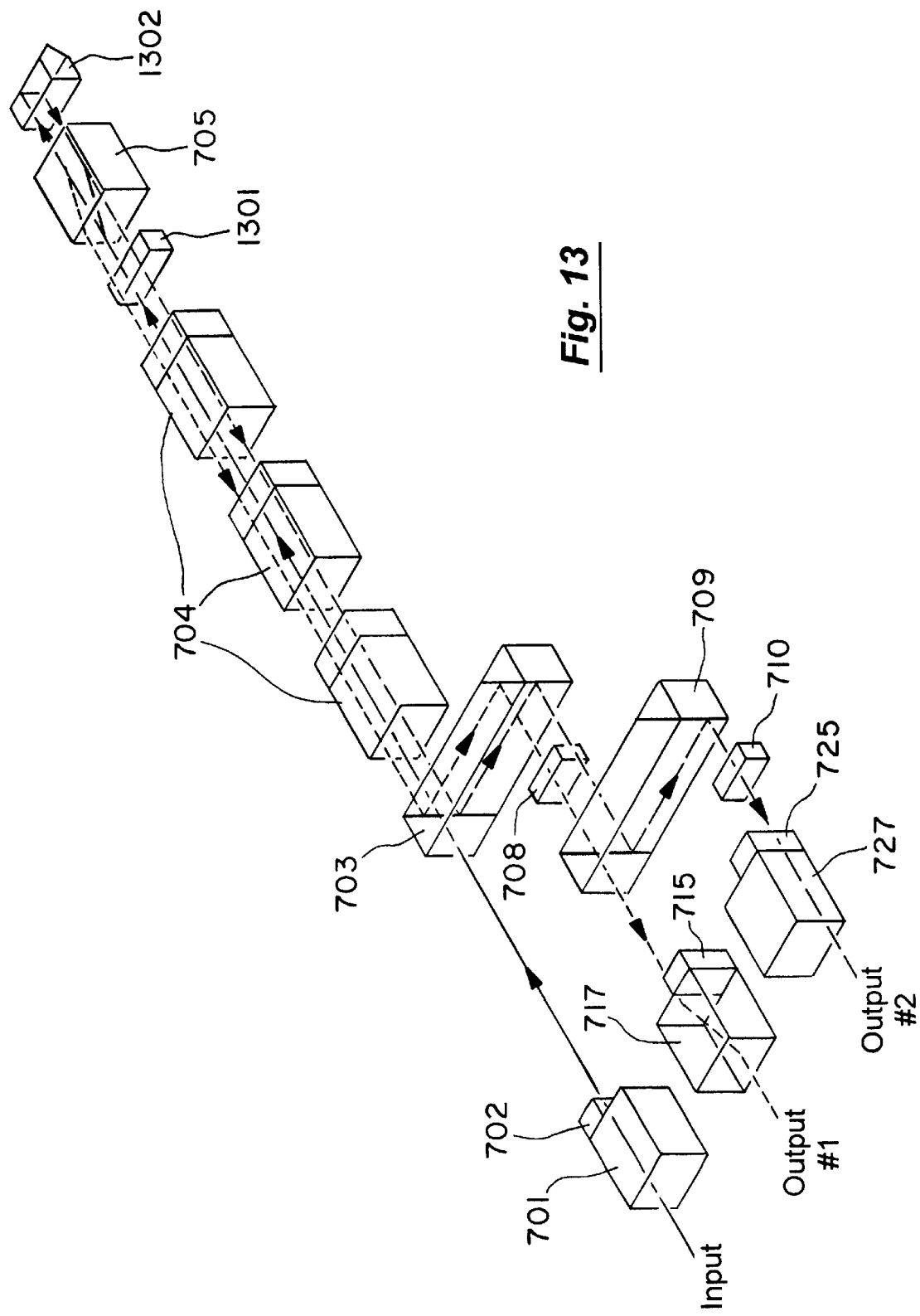
FIG. 13 is a perspective view of another embodiment of the wavelength filter using a vertical beam displacer and a retro-reflector.

FIG. 13 is a perspective view of another embodiment of the wavelength filter using a vertical beam displacer and a retro-reflector 1302 to fold the beam paths. On the forward pass, both polarized input beams pass through a half-wave plate 1301 that rotates their polarizations by 90 degrees. A birefringent element 705 spatially separates these beams into two pairs of orthogonally-polarized components. The retro-reflector 1302 reflects all four beams, but exchanges their left/right positions, so that the left beams on the forward pass become the right beams on the reflected pass, and vice versa. Due to this left/right reversal, the reflected beam pairs are routed by the birefringent element 705 so that they do not pass through half-wave plate 1301, as illustrated in FIG. 13. As in FIG. 9, each pair of reflected beams travel in the same horizontal plane through the waveplates 704 as the corresponding polarized input beam. After passing through the waveplates 704, the reflected beam pairs are separated from the polarized input beams by the first polarization-dependent routing element 703 and routed to the output ports, as previously discussed with regard to FIG. 9.

In the embodiment depicted in FIG. 13, the half-wave plate 1301 replaces the quarter-wave plate 706 in FIG. 9 in rotating the polarization of the reflected beams by 90 degrees. In FIG. 9, the beams pass through the quarter-wave plate twice, while in FIG. 13, the beams pass through the half-wave plate once, thereby accomplishing the same polarization rotation. Thus, it should be expressly understood that any type of polarization rotating element could be employed for this purpose.

The above disclosure sets forth a number of embodiments of the present invention. Other arrangements or embodiments, not precisely set forth, could be practiced under the teachings of the present invention and as set forth in the following claims.

We claim:

1. An optical wavelength filter separating an input signal into a first output signal having a first spectral band and a second output signal having a second spectral band, wherein the first and second spectral bands are substantially complementary, said optical wavelength filter comprising:

a polarizer converting an input signal to a predetermined polarization;

a series of birefringent waveplates providing a polarization-dependent optical transmission function such that the polarized input signal is decomposed into a first beam component carrying the first spectral band at a first polarization and a second beam component carrying the second spectral band at a second polarization that is orthogonal to the first polarization;

a beam displacer spatially separating the beam components exiting the waveplates into a pair of orthogonally-polarized beams;

a reflector reflecting the beams from the beam displacer back along optical paths through the beam displacer and waveplates;

a polarization rotating element rotating the polarization of the beams such that the reflected beams are rotated by 90 degrees with respect to the polarization of the orthogonally polarized beams exiting the beam displacer;

wherein the beam displacer routes the reflected beams along optical paths through the waveplates that are offset, but parallel to the optical path of the polarized input signal;

wherein the waveplates further purify the spectral characteristics of the reflected beams and maintain the polarization of one of the reflected beams, while rotating the polarization of the other reflected beam so that both reflected beams have substantially the same polarization;

a first routing element operable to further offset the reflected beams from the polarized input signal; and a second routing element routing one of the reflected beams exiting the waveplates to a first output port and the other reflected beam to a second output port.

2. The optical wavelength filter of claim 1 wherein the second routing element comprises:

a polarizer rotating the polarization of at least one of the reflected beams exiting the waveplates so that the reflected beams have substantially orthogonal polarizations; and a polarization-dependent routing element routing one of the reflected beams to a first output port and the other reflected beam to a second output port.

3. The optical wavelength filter of claim 1 wherein the reflected beams exiting the waveplates have a polarization that is orthogonal to that of the polarized input signal, and wherein the first routing element alters the optical paths of the reflected beams based upon the polarization of the reflected beams.

4. The optical wavelength filter of claim 1 wherein at least one output port further comprises a polarization mode dispersion compensator.

5. The optical wavelength filter of claim 1 wherein said waveplates comprise a birefringent material selected from the group consisting of calcite, rutile, $YVO_4$, and $LiNbO_3$.

6. The optical wavelength filter of claim 1 wherein said polarization rotating element comprises a half-wave plate.

7. The optical wavelength filter of claim 1 wherein said polarization rotating element comprises a quarter-wave plate through which the beams pass twice.

8. The optical wavelength filter of claim 1 wherein the first routing element comprises a polarization beam splitter operable to propagate the polarized input signal toward the waveplates and to route the reflected beams away from the polarized input signal.

9. An optical wavelength filter separating an input signal into a first output signal having a first spectral band and a second output signal having a second spectral band, wherein the first and second spectral bands are substantially complementary, said optical wavelength filter comprising:

a polarizer converting an input signal to a predetermined polarization;

a series of birefringent waveplates providing a polarization-dependent optical transmission function such that the polarized input signal is decomposed into a first beam component carrying the first spectral band at a first polarization and a second beam component carrying the second spectral band at a second polarization that is orthogonal to the first polarization;

a beam displacer spatially separating the beam components exiting the waveplates into a pair of orthogonally-polarized beams;

a quarter-wave plate converting the pair of orthogonally-polarized beams into a pair of circularly-polarized beams;

a reflector reflecting the circularly-polarized beams back along optical paths through the quarter-wave plate, beam displacer, and waveplates;

wherein the quarter-wave plate converts the circularly-polarized reflected beams into two orthogonally-polarized beams having polarizations that are rotated by 90 degrees from those of the orthogonally-polarized beams entering the quarter-wave plate from the beam displacer;

wherein the beam displacer routes the orthogonally-polarized reflected beams along optical paths through the waveplates that are offset, but parallel to the optical path of the polarized input signal;

wherein the waveplates further purify the spectral characteristics of the reflected beams and maintain the polarization of one of the reflected beams, while rotating the polarization of the other reflected beam so that both reflected beams have substantially the same polarization; and a first routing element operable to further offset the reflected beams from the polarized input signal; and a second routing element routing one of the reflected beams exiting the waveplates to a first output port and the other reflected beam to a second output port.

10. The optical wavelength filter of claim 9 wherein the reflected beams exiting the waveplates have a polarization that is orthogonal to that of the polarized input signal, and wherein the first routing element alters the optical paths of the reflected beams based upon the polarization of the reflected beams.

11. The optical wavelength filter of claim 9 wherein at least one output port further comprises a polarization mode dispersion compensator.

12. The optical wavelength filter of claim 9 wherein said waveplates comprise a birefringent material selected from the group consisting of calcite, rutile, $YVO_4$, and $LiNbO_3$.

13. The optical wavelength filter of claim 9 wherein the second routing element comprises:

a polarizer rotating the polarization of at least one of the reflected beams exiting the waveplates so that the reflected beams have substantially orthogonal polarizations; and a polarization-dependent routing element routing one of the reflected beams to a first output port and the other reflected beam to a second output port.

14. The optical wavelength filter of claim 9 wherein the first routing element comprises a polarization beam splitter operable to propagate the polarized input signal toward the waveplates and to route the reflected beams away from the polarized input signal.

15. A method for separating an input signal into a first output signal having a first spectral band and a second output signal having a second spectral band, wherein the first and second spectral bands are substantially complementary, said method comprising:

converting an input signal to a predetermined polarization;

providing a series of birefringent waveplates having a polarization-dependent optical transmission function such that the polarized signal is decomposed into a first beam component carrying the first spectral band at a first polarization and a second beam component carrying the second spectral band at a second polarization that is orthogonal to the first polarization;

spatially separating the beam components exiting the waveplates into a pair of orthogonally-polarized beams;

rotating the polarizations of the beam pair by 90 degrees;

reflecting the beam pair;

routing the reflected beams along optical paths through the waveplates that are offset, but parallel to the optical path of the polarized input signal;

wherein the waveplates further purify the spectral characteristics of the reflected beams and maintain the polarization of one of the reflected beams, while rotating the polarization of the other reflected beam so that both reflected beams have substantially the same polarization;

further offsetting the reflected beams from the polarized input signal; and routing one of the reflected beams exiting the waveplates to a first output port and the other reflected beam to a second output port.

16. The method of claim 15 wherein the waveplates comprise a birefringent material selected from the group consisting of calcite, rutile, $YVO_4$, and $LiNbO_3$.

17. The method of claim 15 wherein the step of routing the reflected beams to the first and second output ports further comprises:

rotating the polarization of at least one of the reflected beams so that the reflected beams have substantially orthogonal polarizations; and routing one of the reflected beams to a first output port and the other reflected beam to a second output port based on the polarizations of the reflected beams.

18. The method of claim 15 wherein the reflected beams exiting the waveplates have a polarization that is orthogonal to that of the polarized input signal, and wherein the step of further offsetting the reflected beams from the polarized input signal is performed by a polarization-dependent routing element.

19. The method of claim 15 wherein further offsetting comprises routing the reflected beams away from the polarized input signal using a polarization beam splitter.

20. An optical wavelength filter separating an input signal into a first output signal having a first spectral band and a second output signal having a second spectral band, wherein the first and second spectral bands are substantially complementary, said optical wavelength filter comprising:

a first beam displacer spatially separating an input signal into a first beam and a second beam having orthogonal polarizations;

a first polarization rotator rotating the polarization of at least one of the orthogonally-polarized beams so that both beams have substantially the same polarization;

a series of birefringent waveplates providing a polarization-dependent optical transmission function such that the first beam is decomposed into a first beam component and a second beam component, and the second beam decomposes into a third beam component and a fourth beam component, wherein the first and third beam components carry the first spectral band at a first polarization and the second and fourth beam components carry the second spectral band at a second polarization that is orthogonal to the first polarization;

a second beam displacer spatially separating the beam components exiting the waveplates into two pairs of orthogonally-polarized beams;

a quarter-wave plate converting the two pairs of orthogonally-polarized beams into circularly-polarized beams;

a mirror reflecting the circularly-polarized beams exiting the quarter-wave plate back along optical paths through the quarter-wave plate, beam displacer, and waveplates;

wherein the quarter-wave plate converts the reflected circularly-polarized beams into two pairs of orthogonally-polarized beams having polarizations that are rotated by 90 degrees from those of the orthogonally-polarized beams entering the quarter-wave plate from the second beam displacer;

wherein the waveplates further purify the spectral characteristics of the reflected beams and maintain the polarization of the pair of reflected beams having the first polarization, while rotating the polarization of the pair of reflected beams having the second polarization so that all of the reflected beams have a polarization that is orthogonal to that of the first beam and the second beam received by the waveplates;

a second polarization rotator rotating the polarization of at least one beam of each pair of reflected beams so that both pairs of reflected beams have substantially orthogonal polarizations, wherein the beams carrying the first spectral band have substantially the same polarization and the beams carrying the second spectral band have substantially the same polarization; and a polarization-dependent routing element routing the beams carrying the first spectral band along an optical path toward a first output port, and routing the beams carrying the second spectral band along an optical path toward a second output port.

21. The optical wavelength filter of claim 20 wherein at least one output port further comprises:

a polarization rotator rotating the polarization of at least one of the beams from the polarization-dependent routing element so that the beams become orthogonally polarized; and a birefringent element combining the orthogonally-polarized beams at the output port.

22. The optical wavelength filter of claim 21 wherein at least one output port further comprises a polarization mode dispersion compensator.

23. The optical wavelength filter of claim 20 further comprising a polarization-dependent routing element offsetting the reflected beams exiting the waveplates from the first beam and the second beam.

24. The optical wavelength filter of claim 23 wherein the polarization-dependent routing element comprises a polarization beam splitter operable to propagate the first beam and the second beam toward the waveplates and to route the reflected beams away from the first beam and the second beam.

25. The optical wavelength filter of claim 17 wherein said waveplates comprise a birefringent material selected from the group consisting of calcite, rutile, $YVO_4$, and $LiNbO_3$.

26. An optical wavelength filter separating an input signal into a first output signal having a first spectral band and a second output signal having a second spectral band, wherein the first and second spectral bands are substantially complementary, said optical wavelength filter comprising:
- a polarizer converting an input signal to a predetermined polarization;
- a series of birefringent waveplates providing a polarization-dependent optical transmission function such that the polarized beam is decomposed into a first beam component carrying the first spectral band at a first polarization and a second beam component carrying the second spectral band at a second polarization that is orthogonal to the first polarization;
- a beam displacer spatially separating the beam components exiting the waveplates into a pair of orthogonally-polarized beams;
- a quarter-wave plate converting the pair of orthogonally-polarized beams into a pair of circularly-polarized beams;
- a mirror reflecting the circularly-polarized beams back along optical paths through the quarter-wave plate, beam displacer, and waveplates;
- wherein the quarter-wave plate converts the reflected circularly-polarized beams into two orthogonally-polarized beams having polarizations that are rotated by 90 degrees from those of the orthogonally-polarized beams entering the quarter-wave plate from the beam displacer;
- wherein the beam displacer routes the orthogonally-polarized reflected beams along optical paths through the waveplates that are offset, but parallel to the optical path of the polarized input signal;
- wherein the waveplates further purify the spectral characteristics of the reflected beams and maintain the polarization of one of the reflected beams, while rotating the polarization of the other reflected beam so that both reflected beams have substantially the same polarization, which is substantially orthogonal to the polarization of the polarized input signal; and
- a polarization-dependent routing element further offsetting the reflected beams exiting the waveplates from the polarized input signal;
- a dual-core collimator having a first output port coupled to a first optical fiber and a second output port coupled to a second optical fiber; and
- a converging element converging the reflected beams exiting the polarization-dependent routing element so that one beam is directed to the first output port of the dual-core collimator and the other beam is directed to the second output port of the dual-core collimator.

27. The optical wavelength filter of claim 26 wherein the polarization-dependent routing element comprises a polarization beam splitter operable to propagate the polarized input signal toward the waveplates and to route the reflected beams away from the polarized input signal.

28. The optical wavelength filter of claim 26 wherein said waveplates comprise a birefringent material selected from the group consisting of calcite, rutile, $YVO_4$, and $LiNbO_3$.

29. The optical wavelength filter of claim 26 wherein the converging element comprises a Wollaston prism.

30. The optical wavelength filter of claim 26 wherein the converging element comprises an angle compensator prism.

31. An optical device for processing an input signal, comprising:
- a first beam displacer operable to spatially separate an input signal into a first beam and a second beam having orthogonal polarizations;
- a first polarization rotator operable to rotate the polarization of at least one of the orthogonally-polarized beams so that both beams have substantially the same polarization;
- a wavelength filter providing a polarization-dependent optical transmission function such that the first beam is processed into a first beam component and a second beam component, and the second beam is processed into a third beam component and a fourth beam component, wherein the first and third beam components carry a first spectral band at a first polarization and the second and fourth beam components carry a second spectral band at a second polarization that is orthogonal to the first polarization;
- a second polarization rotator operable to rotate by ninety degrees the beam components exiting the wavelength filter;
- a second beam displacer spatially separating the beam components exiting the polarization rotator into two pairs of orthogonally-polarized beams;
- a reflector operable to reflect the two pairs of orthogonally-polarized beams such that the second beam displacer propagates the two pairs of orthogonally-polarized beams to the wavelength filter without the two pairs of orthogonally-polarized beams passing through the second polarization rotator;
- a routing element operable to route the reflected beams carrying the first spectral band along an optical path toward a first output port for communication as a first output signal, and routing the reflected beams carrying the second spectral band along an optical path toward a second output port for communication as a second output signal.

32. The optical device of claim 31 further comprising a demultiplexer operable to process the first output signal to produce a third output signal and a fourth output signal, wherein the third output signal comprises a third spectral band and the fourth output signal comprises a fourth spectral band.

33. The optical device of claim 32 wherein a plurality of transmission peaks associated with the first spectral band are flatter than a plurality of transmission peaks associated with at least the third spectral band.

34. The optical device of claim 32 wherein a plurality of transmission peaks associated with the first spectral band exhibit higher isolation than a plurality of transmission peaks associated with at least the third spectral band.

35. The optical device of claim 32 wherein the first spectral band exhibits steeper roll-offs from transmission peaks than at least the third spectral band.

36. The optical device of claim 32 wherein the demultiplexer comprises a selected one of an arrayed waveguide device, a diffraction grating device, a fiber Bragg grating device, a thin-film interference filter, or a polarization-based demultiplexing device.

37. The optical device of claim 31 wherein the wavelength filter further purifies the spectral characteristics of the reflected beams and maintains the polarization of the pair of reflected beams having the first polarization, while rotating the polarization of the pair of reflected beams having the second polarization so that all of the reflected beams have a polarization that is orthogonal to that of the first beam and second beam received by the wavelength filter.

38. The optical device of claim 31 wherein the first and second spectral bands are substantially complementary.

39. The optical device of claim wherein the routing element comprises:

a third polarization rotator rotating the polarization of at least one beam of each pair of reflected beams such that the beams carrying the first spectral band have substantially the same polarization and the beams carrying the second spectral band have substantially the same polarization orthogonal to that of the beams carrying the first spectral band; and a polarization-dependent routing element routing the beams carrying the first spectral band along an optical path toward a first output port, and routing the beams carrying the second spectral band along an optical path toward a second output port.

40. The optical device of claim 31 wherein the reflector exchanges the optical paths of the two pairs of orthogonally-polarized beams.

41. The optical device of claim 31 wherein:

a first pair of the two pairs of orthogonally-polarized beams propagate in a forward direction along a first pair of optical paths toward the reflector;

a second pair of the two pairs of orthogonally-polarized beams propagate in a forward direction along a second pair of optical paths toward the reflector;

the reflector reflects the first pair such that the first pair propagates in a reverse direction along the second pair of optical paths toward the wavelength filter; and the reflector reflects the second pair such that second pair propagates in a reverse direction along the first pair of optical paths toward the wavelength filter.

42. The optical device of claim 31 further comprising a polarization beam splitter operable to propagate the first and second beams toward the wavelength filter and to route the reflected beams away from the first and second beams.

43. A method for processing an optical signal, comprising:

receiving a first beam and a second beam associated with an input signal, the first beam and the second beam having substantially the same polarization;

applying a polarization-dependent optical transmission function such that the first beam is processed into a first beam component and a second beam component, and the second beam is processed into a third beam component and a fourth beam component, wherein the first and third beam components carry a first spectral band at a first polarization and the second and fourth beam components carry a second spectral band at a second polarization that is orthogonal to the first polarization;

rotating by ninety degrees the beam components;

spatially separating the beam components into two pairs of orthogonally-polarized beams, wherein the step of rotating by ninety degrees is performed prior to the step of spatially separating;

reflecting the two pairs of orthogonally-polarized beams;

routing the reflected beams carrying the first spectral band along an optical path toward a first output port for communication as a first output signal; and routing the reflected beams carrying the second spectral band along an optical path toward a second output port for communication as a second output signal.

44. The method of claim 43 further comprising the following steps performed prior to the step of receiving a first beam and a second beam:

spatially separating an input signal into the first beam and the second beam having orthogonal polarizations; and rotating the polarization of at least one of the first beam and the second beam such that the first beam and the second beam have substantially the same polarization.

45. The method of claim 43 further comprising:

maintaining the polarization of one of the reflected beams from each pair of orthogonally polarized beams;

rotating the polarization of the other of the reflected beams from each pair of orthogonally polarized beams such that all of the reflected beams have a polarization that is orthogonal to polarization of the first beam and the second beam; and routing the reflected beams away from the first beam and the second beam based upon the polarization of the reflected beams.

46. The method of claim 43 wherein the first and second spectral bands are substantially complementary.

47. The method of claim 43 further comprising:

rotating the polarization of at least one beam of each pair of reflected beams such that the beams carrying the first spectral band have substantially the same polarization and the beams carrying the second spectral band have substantially the same polarization orthogonal to that of the beams carrying the first spectral band; and routing the reflected beams based upon their polarizations.

48. The method of claim 43 the step of reflecting exchanges the optical paths of the two pairs of orthogonally-polarized beams.

49. The method of claim 43 further comprising:

propagating a first pair of the two pairs of orthogonally-polarized beams in a forward direction along a first pair of optical paths; and forward propagating a second pair of the two pairs of orthogonally-polarized beams in a direction along a second pair of optical paths;

wherein the step of reflecting comprises:

reflecting the first pair such that the first pair propagates in a reverse direction along the second pair of optical paths; and reflecting the second pair such that the second pair propagates in a reverse direction along the first pair of optical paths.

50. The method of claim 43 further comprising demultiplexing the first output signal to produce a third output signal and a fourth output signal, wherein the third output signal comprises a third spectral band and the fourth output signal comprises a fourth spectral band.

51. The method of claim 50 wherein a plurality of transmission peaks associated with the first spectral band are flatter than a plurality of transmission peaks associated with at least the third spectral band.

52. The method of claim 50 wherein a plurality of transmission peaks associated with the first spectral band exhibit higher isolation than a plurality of transmission peaks associated with at least the third spectral band.

53. The method of claim 50 wherein the first spectral band exhibits steeper roll-offs from transmission peaks than at least the third spectral band.

54. The method of claim 50 wherein the step of demultiplexing is performed by a selected one of an arrayed waveguide device, a diffraction grating device, a fiber Bragg grating device, a thin-film interference filter, or a polarization-based demultiplexing device.

* * * * *